United States Patent
Hu

(10) Patent No.: US 12,200,810 B2
(45) Date of Patent: Jan. 14, 2025

(54) CONGESTION CONTROL METHOD AND APPARATUS

(71) Applicant: HUAWEI TECHNOLOGIES CO., LTD., Guangdong (CN)

(72) Inventor: Li Hu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 545 days.

(21) Appl. No.: 17/554,242

(22) Filed: Dec. 17, 2021

(65) Prior Publication Data
US 2022/0256396 A1    Aug. 11, 2022

Related U.S. Application Data

(63) Continuation of application No. PCT/CN2020/096617, filed on Jun. 17, 2020.

(30) Foreign Application Priority Data

Jun. 17, 2019   (CN) .................... 201910520532.0

(51) Int. Cl.
*H04W 76/30*   (2018.01)
*H04W 28/02*   (2009.01)

(52) U.S. Cl.
CPC ....... *H04W 76/30* (2018.02); *H04W 28/0284* (2013.01); *H04W 28/0289* (2013.01)

(58) Field of Classification Search
CPC ......... H04W 28/0284; H04W 28/0289; H04W 76/30; H04W 76/11; H04W 76/18; H04W 76/32; H04L 47/32; H04L 45/66; H04L 47/12; H04L 43/0817; H04L 43/0876
See application file for complete search history.

(56) References Cited

U.S. PATENT DOCUMENTS

| 2013/0194919 | A1  | 8/2013  | Garavaglia et al. |
| 2014/0321271 | A1  | 10/2014 | Bonnier et al. |
| 2017/0019750 | A1  | 1/2017  | Palanisamy et al. |
| 2018/0020370 | A1* | 1/2018  | Zhou ............... H04M 15/66 |
| 2018/0124087 | A1* | 5/2018  | Shi ................ H04W 12/12 |
| 2021/0029579 | A1* | 1/2021  | Tiwari ............. H04W 76/38 |

FOREIGN PATENT DOCUMENTS

| CN | 1770885    A  | 5/2006 |
| CN | 101925038  A  | 12/2010 |
| CN | 102123493  A  | 7/2011 |
| EP | 2512176    A1 | 10/2012 |
| EP | 2757824    A2 | 7/2014 |

* cited by examiner

*Primary Examiner* — Kibrom T Hailu

(57) ABSTRACT

This application provides a congestion control method and an apparatus. According to the method, a control node may determine that a data processing node is in a congested state, where the data processing node is configured to process data sent by a terminal apparatus. The control node may send a first message to a first terminal apparatus corresponding to a terminal apparatus identifier in a list stored in the control node. The first terminal apparatus identifier in the list is of the first terminal apparatus in a first terminal apparatus abnormal state. The first terminal apparatus identifier is received by the control node. The first message indicates to release a user plane connection, and the user plane connection is used to transmit data of the first terminal apparatus.

20 Claims, 9 Drawing Sheets

CONGESTION CONTROL METHOD AND APPARATUS

CROSS-REFERENCE TO RELATED APPLICATIONS

This application is a continuation of International Patent Application No. PCT/CN2020/096617, filed on Jun. 17, 2020, which claims priority to Chinese Patent Application No. 201910520532.0, filed on Jun. 17, 2019. The disclosures of the aforementioned applications are hereby incorporated by reference in their entireties.

TECHNICAL FIELD

This application relates to the field of mobile communication technologies, and in particular, to a congestion control method and an apparatus.

BACKGROUND

A 5th generation (5G) wireless communication technology is characterized by a large capacity and a high rate. Therefore, the 5G wireless communication system needs to have a relatively strong congestion control capability, to cope with node congestion that may occur in large-capacity and high-rate transmission. One of causes of the node congestion is that an amount of data to be processed at a node is excessively large. This causes the node to be overloaded. For example, a malicious terminal or user equipment (UE) launches a distributed denial of service (DDoS) attack, to simultaneously initiate a large quantity of connections and transmit a large amount of attack traffic to a server. Consequently, a node that process the traffic becomes congested.

Currently, a main manner in which the wireless communication system performs congestion control is that a node rejects a service request from UE after the node is congested. For example, service requests that are from all UEs and that do not satisfy a priority requirement are rejected. This congestion control mode may affect normal services of a large quantity of UEs and needs to be improved.

SUMMARY

This application provides a congestion control method and an apparatus, to optimize a congestion control manner of a wireless communication system.

According to a first aspect, this application provides a congestion control method. The method may be implemented by a control node. According to the method, the control node may determine that a data processing node is in a congested state, where the data processing node is configured to process data sent by a terminal apparatus; and the control node may send a first message to a first terminal apparatus corresponding to a terminal apparatus identifier in a list stored in the control node, where the terminal apparatus identifier in the list is an identifier that is of the first terminal apparatus in an abnormal state and that is received by the control node, the first message is used to indicate to release a user plane connection, and the user plane connection is used to transmit data of the first terminal apparatus.

According to the foregoing method, after the data processing node is congested, the control node may perform, based on the stored list, congestion control on the terminal apparatus to which the identifier in the list belongs. Because the list includes the identifier of the terminal apparatus in the abnormal state, when performing the congestion control, the control node may release the user plane connection of the terminal apparatus in the abnormal state, to avoid impact of the congestion control on a terminal apparatus whose identifier is not included in the list.

In addition, data of terminal devices that are in abnormal states and that are detected by an AF/NWDAF is relatively large, generally, and is not suitable for distributed storage, and the terminal devices in the abnormal states also need to be processed in a centralized manner. Therefore, an independent control node is introduced to reduce storage overheads of the terminal devices in an entire network, and facilitate processing of the abnormal terminal devices in the centralized manner. The data processing node may notify the control node to process a large quantity of terminal devices in abnormal states. This notification manner may use relatively low signaling overheads, so that storage overheads and processing overheads of the data processing node are reduced.

The control node may receive an identifier of a second terminal apparatus, where the second terminal apparatus is a terminal apparatus in the abnormal state. The identifier of the second terminal is included in the list. If the data processing node is not in the congested state within a first duration, the control node may delete the identifier of the second terminal apparatus from the list. In this way, the control node may control the second terminal apparatus within the first duration. After the first duration expires, the second terminal apparatus causes a relatively low congestion probability of the data processing node, so that the control node does not control the terminal apparatus, to avoid impact on a normal service of the terminal apparatus.

Each second terminal apparatus satisfies any one or more of the following conditions: a distributed denial of service DDoS attack exists in a user plane data transmission process of the second terminal apparatus; a target address of user plane data of the second terminal apparatus is incorrect; transmission duration of user plane data of the second terminal apparatus reaches threshold duration; a data length of user plane data of the second terminal apparatus reaches a threshold length; or a transmission rate of user plane data of the second terminal apparatus reaches a threshold rate.

If the data processing node is not in the congested state within a second duration, the control node may delete the list; or delete all identifiers from the list. In this way, the control node may control, within the second duration, terminal apparatuses that are in the list and that correspond to the second duration. After the second duration expires, the terminal apparatuses cause a relatively low congestion probability of the data processing node, so that the terminal apparatuses are not controlled, to avoid impact on a normal service of the terminal apparatus.

Optionally, the control node may determine, based on a received first indication, that the data processing node is in the congested state. The first indication may include an identifier of the data processing node.

In an example, the first indication may be used to indicate that the data processing node is in the congested state.

Before receiving the first indication, the control node may send a second indication to the data processing node, where the second indication is used to indicate the data processing node to send the first indication when the data processing node is in the congested state.

In another example, the first indication may be used to indicate a running status of the data control node, for example, CPU usage and/or a data packet loss rate.

Before receiving the first indication, the control node may send a second indication to the data processing node, where the second indication is used to indicate the data processing node to send the first indication when the data processing node satisfies a specific condition for sending the first indication. For example, the specific condition for sending the first indication may be that a sending periodicity is satisfied or a specific event occurs. For example, the data processing node may report, based on the second indication, CPU usage after the CPU usage reaches (or exceeds) a usage threshold included in the second indication; and/or the data processing node may report, based on the second indication, a data packet loss rate (or referred to as a packet loss rate) after the data packet loss rate reaches (or exceeds) a data packet loss rate threshold included in the second indication.

The first message may include an identifier of the user plane connection. Therefore, the first message may be used to indicate the first terminal apparatus to release the user plane connection indicated by the first message, to avoid impact of the congestion control on another user plane connection.

When the control node includes an SMF, and there are a plurality of data processing nodes, the control node may determine an identifier of a data network based on respective contexts of the plurality of data processing nodes, where at least two of the plurality of data processing nodes support the data network, the respective contexts of the plurality of data processing nodes are stored in the control node, and the context of each data processing node includes an identifier of a data network supported by the data processing node; and the control node may determine the identifier of the user plane connection based on a context of the first terminal apparatus and the identifier of the data network, where the context of the first terminal apparatus is stored in the control node, and the context of the first terminal apparatus includes the identifier of the user plane connection that accesses the data network.

When the control node includes an AMF, and there are a plurality of data processing nodes, the control node may receive an identifier of a data network from an SMF, where at least two of the plurality of data processing nodes support the data network; and the control node may determine the identifier of the user plane connection based on a context of the first terminal apparatus and the identifier of the data network, where the context of the first terminal apparatus is stored in the control node, and the context of the first terminal apparatus includes the identifier of the user plane connection that accesses the data network.

In an example, when the control node includes the SMF, if the control node determines that the data processing node is in the congested state, when receiving a first user plane connection establishment request from the first terminal apparatus, the control node may send a reject response to the first terminal apparatus, where the reject response corresponds to the first user plane connection establishment request, and the reject response is used to indicate the first terminal apparatus not to send the user plane connection establishment request within third duration.

Further, when the control node determines that the data processing node is not in the congested state, if the control node further receives a second user plane connection establishment request from the first terminal apparatus, the control node may send an accept response to the first terminal apparatus, where the accept response corresponds to the second user plane connection establishment request. Therefore, when the control node determines that the data processing node is not in the congested state, the control node does not reject the user plane connection establishment request of the first terminal apparatus, to avoid impact on a normal service of the terminal apparatus.

In an example, when the control node includes the AMF, if the control node receives a first signaling connection establishment request from the first terminal apparatus, the control node may send a reject response to the first terminal apparatus, where the reject response corresponds to the first signaling connection establishment request, and the reject response is used to indicate the abnormal terminal apparatus not to send the signaling connection establishment request within fourth duration.

Further, when the control node determines that the data processing node is not in the congested state, if the control node receives a second signaling connection establishment request from the first terminal apparatus, the control node may send an accept response to the first terminal apparatus, where the accept response corresponds to the second signaling connection establishment request. Therefore, when the control node determines that the data processing node is not in the congested state, the control node does not reject the signaling connection establishment request of the first terminal apparatus, to avoid impact on the normal service of the terminal apparatus.

For example, the control node may receive a third indication, and determine, based on the third indication, that the data processing node is not in the congested state. The third indication may include the identifier of the data processing node. Therefore, the control node may learn in time that the data node is not in the congested state, to avoid impact on a service of the first terminal apparatus.

In an example, the third indication may be used to indicate that the data processing node is not in the congested state. In this case, the third indication may be sent after the data processing node determines that the data processing node is not in the congested state.

Before receiving the third indication, the control node may further send a fourth indication to the data processing node, where the fourth indication may be used to indicate the data processing node to send the third indication after the data processing node determines that the data processing node is not in the congested state.

In another example, the third indication may be used to indicate a running status of the data processing node, for example, CPU usage and/or a data packet loss rate, and whether the data processing node is not in the congested state is determined based on the third indication in combination with a policy preconfigured in the control node.

Before receiving the third indication, the control node may further send a fourth indication to the data processing node, where the fourth indication is used to indicate the data processing node to send the third indication after the data processing node satisfies a specific condition for sending the third indication. The specific condition may be that a sending periodicity, for example, a periodicity included in the fourth indication, is satisfied. Alternatively, the specific condition may be that a specific event occurs. For example, the data processing node may report, based on the fourth indication, CPU usage after the CPU usage does not reach (or is less than) a usage threshold included in the fourth indication; and/or the data processing node may report, based on the fourth indication, a data packet loss rate after the data packet loss rate does not reach (or is less than) a data packet loss rate threshold included in the fourth indication. It should be understood that the usage threshold included in the fourth indication may be the same as or different from the usage threshold included in the second indication. The data packet loss rate threshold included in the fourth indication may be the same as or different from the data packet loss rate threshold included in the second indication.

Before receiving the third indication, the control node may further send the fourth indication to the data processing node, where the fourth indication is used to indicate the data processing node to send the third indication when the data processing node is not in the congested state.

In an example, when the control node includes the AMF, the control node may further send a second message to the first terminal apparatus, where the second message is used to indicate to set a location of the first terminal apparatus to an unsupported area, and the unsupported area does not support the first terminal apparatus in requesting to establish a signaling connection. In this way, the AMF may modify the location of the first terminal apparatus to the unsupported area, so that the first terminal apparatus does not send the signaling connection establishment request, to reduce occupation of the data processing node.

The first message may include a fifth indication, and the fifth indication is used to indicate the first terminal apparatus not to reply to the first message. Therefore, the control node may enable the first terminal apparatus not to send a response message of the first message, to reduce occupation of the data processing node by the response message.

The foregoing control node may include the SMF or the AMF.

If the control node is the SMF, the first message may be carried in NAS SM signaling. If the control node is the AMF, the first message may be carried in NAS signaling.

According to a second aspect, this application provides a congestion control method. The method may be implemented by a first terminal apparatus. According to the method, the first terminal apparatus may receive a first message from a control node, where the first message is used to indicate to release a user plane connection, the user plane connection is used to transmit data of the first terminal apparatus, the first control message includes a fifth indication, and the fifth indication is used to indicate the first terminal apparatus not to reply to the first message; and the first terminal apparatus may release the user plane connection based on the first message.

According to a third aspect, this application provides a congestion control method. The method may be implemented by a data processing node. According to the method, the data processing node may determine that the data processing node is not in a congested state, and send a third indication to a control node, where the third indication is used to indicate that the data processing node is not in the congested state.

The third indication may include an identifier of the data processing node.

Before sending the third indication, the data processing node may receive a fourth indication from the control node, where the fourth indication is used to indicate the data processing node to send the third indication when the data processing node is not in the congested state.

According to a fourth aspect, this application provides a communication apparatus. The communication apparatus may be configured to perform the steps performed by the control node according to any one of the first aspect or the designs of the first aspect. The communication apparatus may implement functions in the foregoing methods in a form of a hardware structure, a software module, or a combination of a hardware structure and a software module.

When the communication apparatus shown in the fourth aspect is implemented by using a hardware component, the communication apparatus may include a processor. The processor may perform the steps performed by the control node according to any one of the first aspect or the designs of the first aspect. The communication apparatus may include a transceiver. The transceiver may be configured to support the foregoing apparatus in communicating with another device or apparatus. Specifically, the transceiver may be configured to support the communication apparatus in performing communication. When the foregoing apparatus is implemented by using the hardware component, the apparatus may further include a memory. The memory may be configured to store a program, and the program may be executed by the processor to perform the steps performed by the foregoing communication apparatus.

During execution of the method shown in the first aspect, the processor may be configured to determine that a data processing node is in a congested state, where the data processing node is configured to process data sent by a terminal apparatus; and the transceiver may be configured to send a first message to a first terminal apparatus corresponding to a terminal apparatus identifier in a list stored in the control node, where the terminal apparatus identifier in the list is an identifier that is of the first terminal apparatus in an abnormal state and that is received by the control node, the first message is used to indicate to release a user plane connection, and the user plane connection is used to transmit data of the first terminal apparatus.

The transceiver may be further configured to receive an identifier of a second terminal apparatus, where the second terminal apparatus is a terminal apparatus in the abnormal state, and the identifier of the second terminal is included in the list. If the data processing node is not in the congested state within first duration, the processor is further configured to delete the identifier of the second terminal apparatus from the list.

If the data processing node is not in the congested state within second duration, the processor may be further configured to: delete the list; or delete all identifiers from the list.

The transceiver may be further configured to receive a first indication, where the first indication is used to indicate that the data processing node is in the congested state. The processor may determine, based on the first indication, that the data processing node is in the congested state.

The transceiver may be further configured to send a second indication to the data processing node, where the second indication is used to indicate the data processing node to send the first indication when the data processing node is in the congested state.

The first message may include an identifier of the user plane connection.

When the control node includes an SMF, and there are a plurality of data processing nodes, the processor may further determine an identifier of a data network based on respective contexts of the plurality of data processing nodes, where at least two of the plurality of data processing nodes support the data network, the respective contexts of the plurality of data processing nodes are stored in the control node, and the context of each data processing node includes an identifier of a data network supported by the data processing node; and the processor may determine the identifier of the user plane connection based on a context of the first terminal apparatus and the identifier of the data network, where the context of the first terminal apparatus is stored in the control node, and the context of the first terminal apparatus includes the identifier of the user plane connection that accesses the data network.

When the control node includes an AMF, and there are a plurality of data processing nodes, the transceiver may be further configured to receive an identifier of a data network from an SMF, where at least two of the plurality of data processing nodes support the data network; and the processor may be further configured to determine the identifier of the user plane connection based on a context of the first terminal apparatus and the identifier of the data network, where the context of the first terminal apparatus is stored in the control node, and the context of the first terminal apparatus includes the identifier of the user plane connection that accesses the data network.

After it is determined that the data processing node is in the congested state, when the control node includes the SMF, after receiving a first user plane connection establishment request from the first terminal apparatus, the transceiver may further send a reject response to the first terminal apparatus, where the reject response corresponds to the first user plane connection establishment request, and the reject response is used to indicate the first terminal apparatus not to send the user plane connection establishment request within third duration.

The processor may be further configured to determine that the data processing node is not in the congested state. In this case, after receiving a second user plane connection establishment request from the first terminal apparatus, the transceiver may further send an accept response to the first terminal apparatus, where the accept response corresponds to the second user plane connection establishment request.

After it is determined that the data processing node is in the congested state, when the control node includes the AMF, after receiving a first signaling connection establishment request from the first terminal apparatus, the transceiver may further send a reject response to the first terminal apparatus, where the reject response corresponds to the first signaling connection establishment request, and the reject response is used to indicate the abnormal terminal apparatus not to send the signaling connection establishment request within fourth duration.

The processor may be further configured to determine that the data processing node is not in the congested state. In this case, after receiving a second signaling connection establishment request from the first terminal apparatus, the transceiver may further send an accept response to the first terminal apparatus, where the accept response corresponds to the second signaling connection establishment request.

The transceiver may be further configured to receive a third indication, where the third indication is used to indicate that the data processing node is not in the congested state. The processor may determine, based on the third indication, that the data processing node is not in the congested state.

Before receiving the third indication, the transceiver may further send a fourth indication to the data processing node, where the fourth indication is used to indicate the data processing node to send the third indication when the data processing node is not in the congested state.

When the control node includes the AMF, the transceiver may be further configured to send a second message to the first terminal apparatus, where the second message may be used to indicate to set a location of the first terminal apparatus to an unsupported area, and the unsupported area does not support the first terminal apparatus in requesting to establish a signaling connection.

The first message may include a fifth indication, and the fifth indication is used to indicate the first terminal apparatus not to reply to the first message.

When the communication apparatus includes a software module, the communication apparatus may include a communication module and a processing module that are coupled to each other. The communication module may be configured to support the communication apparatus in performing communication, and the processing module may be used by the communication apparatus to perform a processing operation, for example, generate information/a message that needs to be sent; or process a received signal to obtain information/a message. Specifically, the communication module may be configured to perform the foregoing steps performed by the transceiver; and/or the processing module may be configured to perform the foregoing steps performed by the processor.

According to a fifth aspect, this application provides a communication apparatus. The communication apparatus may be configured to perform the steps performed by the first terminal apparatus according to any one of the second aspect or the designs of the second aspect. The communication apparatus may implement functions in the foregoing methods in a form of a hardware structure, a software module, or a combination of a hardware structure and a software module. When the communication apparatus shown in the fifth aspect is implemented by using a hardware component, the communication apparatus may include a processor. The processor may perform the processing steps performed by the first terminal apparatus according to any one of the second aspect or the designs of the second aspect. The communication apparatus may include a transceiver. The transceiver may be configured to support the foregoing apparatus in communicating with another device or apparatus. When the foregoing apparatus is implemented by using the hardware component, the apparatus may further include a memory. The memory may be configured to store a program, and the program may be executed by the processor to perform the processing steps performed by the first terminal apparatus.

During execution of the method shown in the second aspect, the transceiver may be configured to receive a first message from a control node, where the first message is used to indicate to release a user plane connection, the user plane connection is used to transmit data of the terminal apparatus, the first control message includes a fifth indication, and the fifth indication is used to indicate the first terminal apparatus not to reply to the first message; and the processing module may be configured to release the user plane connection based on the first message.

When the communication apparatus includes a software module, the communication apparatus may include a communication module and a processing module that are coupled to each other. The communication module may be configured to support the communication apparatus in performing communication, and the processing module may be used by the communication apparatus to perform a processing operation, for example, generate information/a message that needs to be sent; or process a received signal to obtain information/a message. Specifically, the communication module may be configured to perform the foregoing steps performed by the transceiver; and/or the processing module may be configured to perform the foregoing steps performed by the processor.

According to a sixth aspect, this application provides a communication apparatus. The communication apparatus may be configured to perform the steps performed by the data processing node according to any one of the third aspect or the designs of the third aspect. The communication apparatus may implement functions in the foregoing methods in a form of a hardware structure, a software module, or a combination of a hardware structure and a software module. When the communication apparatus shown in the sixth aspect is implemented by using a hardware component, the communication apparatus may include a processor. The processor may perform the processing steps performed by the data processing node according to any one of the third aspect or the designs of the third aspect. The communication apparatus may include a transceiver. The transceiver may be configured to support the foregoing apparatus in communicating with another device or apparatus. When the foregoing apparatus is implemented by using the hardware component, the apparatus may further include a memory. The memory may be configured to store a program, and the program may be executed by the processor to perform the processing steps performed by the data processing node.

During execution of the method shown in the third aspect, the processing module may be configured to determine that the data processing node is not in a congested state; and the communication module may be configured to send a third indication to a control node, where the third indication is used to indicate that the data processing node is not in the congested state. That the data processing node is not in the congested state means that the data processing node is previously in but is not currently in the congested state.

The third indication may include an identifier of the data processing node.

Before sending the third indication, the communication module may be further configured to receive a fourth indication from the control node, where the fourth indication is used to indicate the data processing node to send the third indication when the data processing node is not in the congested state.

When the communication apparatus includes a software module, the communication apparatus may include a communication module and a processing module that are coupled to each other. The communication module may be configured to support the communication apparatus in performing communication, and the processing module may be used by the communication apparatus to perform a processing operation, for example, generate information/a message that needs to be sent; or process a received signal to obtain information/a message. Specifically, the communication module may be configured to perform the foregoing steps performed by the transceiver; and/or the processing module may be configured to perform the foregoing steps performed by the processor.

According to a seventh aspect, this application provides a communication system. The communication system may include the communication apparatus shown in the fourth aspect and a data processing node.

For example, the communication apparatus shown in the fourth aspect is a control node. During implementation of the congestion control method provided in the embodiments of this application, the control node may be configured to determine that the data processing node is in a congested state, and the data processing node is configured to process data sent by a terminal apparatus. The control node may further send a first message to a first terminal apparatus corresponding to a terminal apparatus identifier in a list stored in the control node, where the terminal apparatus identifier in the list is an identifier that is of the first terminal apparatus in an abnormal state and that is received by the control node, the first message is used to indicate to release a user plane connection, and the user plane connection is used to transmit data of the first terminal apparatus.

The data control node may be configured to send a first indication to the control node. Correspondingly, the control node may receive the first indication from the data processing node. The first indication may be used to indicate that the data control node is in the congested state.

Optionally, the communication system may further include the communication apparatus shown in the fifth aspect. For example, the communication apparatus shown in the fifth aspect is the foregoing first terminal apparatus. The first terminal apparatus may be configured to receive a first message from the control node, and release a user plane connection based on the first message.

Optionally, the communication system may further include the communication apparatus shown in the sixth aspect. For example, the communication apparatus shown in the sixth aspect is the foregoing data processing node, and the data processing node may further send a third indication to the control node. Correspondingly, the control node may receive the third indication from the data processing node. The third indication may be used to indicate that the data processing node is not in the congested state. The third indication may be sent after the data processing node is not in the congested state.

According to an eighth aspect, this application provides a computer storage medium. The computer storage medium stores instructions (or referred to as a program). When the instructions are invoked and executed on a computer, the computer is enabled to perform the method according to any one of the first aspect or the designs of the first aspect, the method according to any one of the second aspect or the designs of the second aspect, or the method according to any one of the third aspect or the designs of the third aspect.

According to a ninth aspect, this application provides a computer program product. The computer program product may include instructions. When the computer program product runs on a computer, the computer is enabled to perform the method according to any one of the first aspect or the designs of the first aspect, the method according to any one of the second aspect or the designs of the second aspect, or the method according to any one of the third aspect or the designs of the third aspect.

According to a tenth aspect, this application provides a chip or a chip system including the chip. The chip may include a processor. The chip may further include a memory (or a storage module) and/or a transceiver (or a communication module). The chip may be configured to perform the method according to any one of the first aspect or the designs of the first aspect, the method according to any one of the second aspect or the designs of the second aspect, or the method according to any one of the third aspect or the designs of the third aspect. The chip system may include the foregoing chip, or may include the foregoing chip and another discrete component, such as a memory (or a storage module) and/or a transceiver (or a communication module).

For beneficial effects of the second aspect to the tenth aspect or the designs of the second aspect to the tenth aspect, refer to the descriptions of the beneficial effects of the method according to any one of the first aspect or the designs of the first aspect.

DESCRIPTION OF EMBODIMENTS

To make the objectives, technical solutions, and advantages of this application clearer, the following further describes this application in detail with reference to the accompanying drawings. It should be understood that a specific operation method in a method embodiment of this application may also be applied to an apparatus embodiment or a system embodiment.

For ease of understanding the solutions in the embodiments of this application, a scenario to which the embodiments of this application may be applied is first described.

Figure 1:
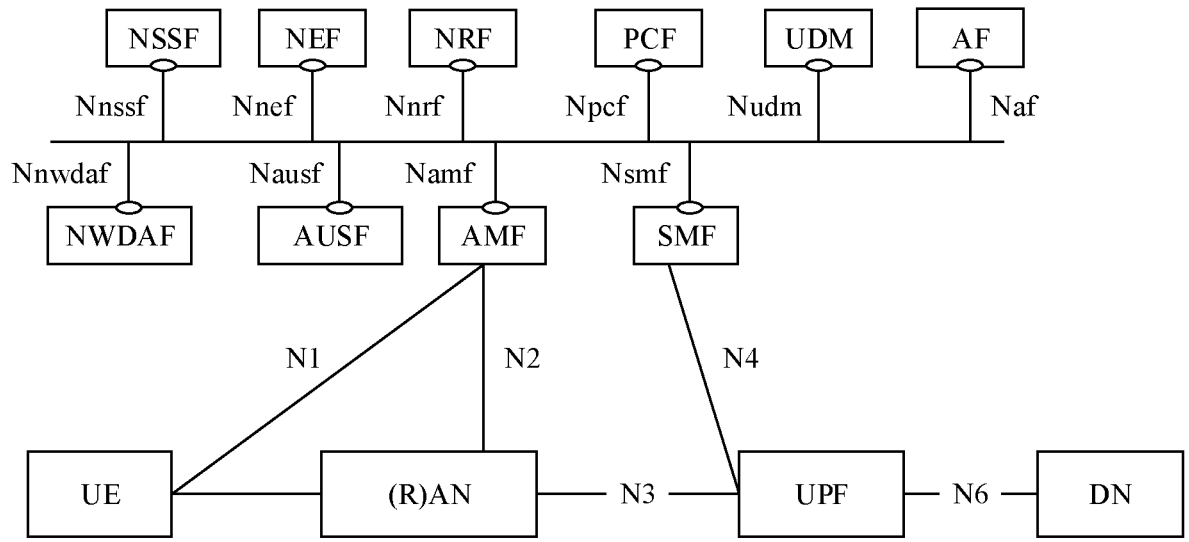
FIG. 1 is a diagram of an architecture of a wireless communication system according to an embodiment of this application.

A congestion control method provided in the embodiments of this application may be applied to a 5G communication system. FIG. 1 is used as an example. A 5G network architecture may include three parts, which are respectively a terminal apparatus, a data network (data network, DN), and a carrier network.

A site in the carrier network may include but is not limited to a network slice selection (NSSF) network element, a network exposure function (NEF) network element, a network repository function (NRF) network element, a policy control function (PCF) network element, a unified data management (UDM) network element, an application function (AF) network element, a network data analysis function (NWDAF) network element, an authentication server function (AUSF) network element, an access and mobility management function (AMF) network element, a session management function (SMF) network element, a (radio) access network ((R)AN), a user plane function (UPF) network element, and the like. In the foregoing carrier network, a part other than the (radio) access network may be referred to as a core network (CN). For ease of description, an example in which the (R)AN is referred to as an access network device is used below for description.

The UE shown in FIG. 1 may be a device or an apparatus having wireless transmission and reception functions. The UE may be deployed on land, and includes an indoor device or an outdoor device, a handheld device, or a vehicle-mounted device; or may be deployed on a water surface (for example, a ship); or may be deployed in air (for example, an airplane, a balloon, or a satellite). The UE may be a mobile phone, a tablet (pad), a computer having wireless transmission and reception functions, a virtual reality (VR) terminal, an augmented reality (AR) terminal, a wireless terminal in industrial control, a wireless terminal such as a mobile robot, an automated guided vehicle (AGV), a sensor, or a device on a control device, a vehicle, or a trainset in a 5G vertical industry, a wireless terminal in self driving, a wireless terminal in telemedicine, a wireless terminal in a smart grid, a wireless terminal in transportation safety, a wireless terminal in a smart city, a wireless terminal in a smart home, or the like. For example, the UE may be implemented by a chip or a chip system. The UE may alternatively be a terminal apparatus. In addition, the terminal apparatus in this application may also be a chip or a chip system.

The UE may establish a connection to the carrier network through an interface (for example, N1) provided by the carrier network, and use services such as data and/or voice provided by the carrier network. The UE may further access the DN through the carrier network, and use a carrier service deployed on the DN and/or a service provided by a third party. The third party may be a service party other than the carrier network and the UE, and may provide services such as data and/or voice for the UE. A specific representation form of the third party may be specifically determined based on an actual application scenario, and is not limited herein.

The access network device is a device that provides a wireless communication function for a terminal. The access network device in this application includes but is not limited to: a next generation NodeB (gNodeB, gNB), an evolved NodeB (evolved NodeB, eNB), a radio network controller (RNC), a NodeB (NodeB, NB), a base station controller (BSC), a base transceiver station (BTS), a home NodeB (for example, a home evolved NodeB or a home NodeB, HNB), a baseband unit (BBU), a transmission reception point (TRP), a transmission point (TP), a mobile switching center, and the like in 5G.

The foregoing network slice selection NSSF network element may be configured to flexibly select a network slice. For example, the network slice selection network element may support a slice selection policy based on a plurality of types of information such as network slice selection assistance information (NSSAI), location information, or slice load information. An intelligent slice selection solution may be implemented according to the slice selection policy. The network slice selection network element may store information such as a slice selection policy configured by a carrier. In 5G, the network slice selection network element may be the NSSF network element. In future communication such as a sixth generation (6G), the network slice selection network element may still be the NSSF network element or have another name. This is not limited in this application.

The access and mobility management function AMF network element (or referred to as an AMF entity) shown above is a control plane network element provided by the carrier network. The AMF network element serves as a termination point of non-access stratum (NAS) signaling, and is responsible for functions such as access authentication and mobility management of the terminal apparatus. In 5G, the access and mobility management function network element may be the AMF network element. In future communication, such as 6th generation, the access and mobility management function network element may still be the AMF network element or have another name. This is not limited in this application. For example, the AMF network element may be implemented by a chip or a chip system.

The session management SMF network element (or referred to as an SMF entity) shown above is a control plane network element provided by the carrier network, and is responsible for managing a protocol data unit (PDU) session of the terminal apparatus. The PDU session is a channel used to transmit a PDU. The PDU needs to be transmitted between the terminal apparatus and the DN through the PDU session. The SMF network element is responsible for establishment, maintenance, deletion, and the like of the PDU session. The SMF network element may include functions such as session management (such as session establishment, modification, and release, including tunnel maintenance between the UPF and the RAN), UE internet protocol (IP) address assignment, and selection of the UPF network element. In 5G, the session management network element may be the SMF network element. In future communication such as 6G, the session management network element may still be the SMF network element or have another name. This is not limited in this application. For example, the SMF network element may be implemented by a chip or a chip system.

The user plane function UPF network element (or referred to as a UPF entity) shown above is a gateway provided by a carrier, and is a gateway for communication between the carrier network and the DN. The UPF network element may include functions such as a user plane mobility anchor, forwarding and routing of user data, packet detection, user plane policy implementation, and quality of service (QoS) processing. In 5G, the user plane function network element may be the UPF network element. In future communication such as 6G, the user plane function network element may still be the UPF network element or have another name. This is not limited in this application. For example, the UPF network element may be implemented by a chip or a chip system.

The DN may also be referred to as a packet data network (PDN), and is a network located outside the carrier network. The carrier network may be connected to a plurality of DNs, and a plurality of services may be deployed on the DNs, to provide services such as data and/or voice for the terminal apparatus. For example, the DN is a private network of a smart factory, a sensor installed in a workshop of the smart factory may be a terminal apparatus, a control server of the sensor is deployed in the DN, and the control server may provide a service for the sensor. The sensor may communicate with the control server, to obtain instructions of the control server, transmit collected sensor data to the control server according to the instructions, and the like. For another example, the DN is an internal office network of a company, a mobile phone or a computer of an employee of the company may be a terminal apparatus, and the mobile phone or the computer of the employee may access information, data resources, and the like on the internal office network of the company. The DN may be identified by using an identifier of the DN, for example, a data network name (DNN). In addition, the identifier of the DN may further include an access point name (APN).

The foregoing unified data management UDM network element (or referred to as a UDM entity) is a control plane network element provided by a carrier, and is responsible for storing information such as a subscription permanent identifier (SUPI), a credential, a security context, and subscription data of a subscriber in the carrier network. The information stored in the UDM network element may be used for authentication and authorization when the terminal apparatus accesses the carrier network. The subscriber in the carrier network may be specifically a subscriber using a service provided by the carrier network, for example, a user using a SIM card of China Telecom, or a user using a SIM card of China Mobile. The SUPI of the subscriber may be a number of the SIM card, or the like. The credential and the security context of the subscriber may be stored small files such as an encryption key of the SIM card or information related to encryption of the SIM card, and are used for authentication and/or authorization. The security context may be cookie, a token, or the like stored in a local terminal (for example, a mobile phone) of the subscriber. The subscription data of the subscriber may be a supporting service of the SIM card, for example, a traffic package or a used network of the SIM card. It should be noted that the permanent identifier, the credential, the security context, the cookie, and the token are equivalent to information related to authentication and authorization, and are not limited or distinguished between each other for ease of description in this application document. Unless otherwise specified, the security context is used as an example for description in this embodiment of this application. However, this embodiment of this application is also applicable to authentication and/or authorization information described in another manner. In 5G, the unified data management network element may be the UDM network element. In future communication such as 6G, the unified data management network element may still be the UDM network element or have another name. This is not limited in this application.

The foregoing network exposure function NEF network element (or referred to as an NEF entity) is a control plane network element provided by a carrier. The network exposure function network element securely exposes an external interface of the carrier network to a third party. When the SMF network element needs to communicate with a third-party network element, the network exposure function network element may serve as a relay for communication between the SMF network element and the third-party network element. When the network exposure function network element serves as the relay, the network exposure function network element may translate identification information of a subscriber and identification information of the third-party network element. For example, when the NEF needs to send an SUPI of the subscriber from the carrier network to the third party, the NEF may translate the SUPI into an external identity (ID) corresponding to the subscriber. When the network exposure function network element sends the external ID (an ID of the third-party network element) to the carrier network, the network exposure function network element may translate the external ID into the SUPI. In 5G, the network exposure function network element may be the NEF network element. In future communication such as 6G, the network exposure function network element may still be the NEF network element or have another name. This is not limited in this application. For example, the NEF network element may be implemented by a chip or a chip system.

The foregoing policy control function PCF network element is a control plane function provided by a carrier, and is configured to provide a policy of a PDU session for the SMF network element. The policy may include a charging-related policy, a QoS-related policy, an authorization-related policy, and the like. In 5G, the policy control function network element may be the PCF network element. In future communication such as 6G, the policy control function network element may still be the PCF network element or have another name. This is not limited in this application.

The foregoing network repository function NRF network element (or referred to as an NRF entity) may be configured to discover, for each network function, a service provided by another network function, and then provide discovered network element information to the requester network element. The network repository function network element may also maintain (for example, store, manage, and update) a feature of an available network element instance and a parameter related to a service capability supported by the network repository function network element, for example, an identifier of the network element instance, a network element type, a PLMN, and a network slice-related identifier, for example, single network slice selection assistance information (S-NSSAI) or a network slice instance identifier, an IP address or a domain name of the network element, capability information of the network element, a name of the supported service capability, or the like. In 5G, the network repository function network element may be the NRF. In future communication such as 6G, the network repository function network element may still be the NRF or have another name. This is not limited in this application.

The foregoing network data analysis function NWDAF network element (or referred to as an NWDAF entity) may be configured to provide a big data analysis service. The entity may collect data from a 3GPP network and perform big data analysis, to provide a better policy. Currently, the NWDAF network element may be configured to detect a UE in an abnormal state (or referred to as having an abnormal behavior). Abnormal states may be that, for example, UE has a DDoS attack behavior, UE is at an unexpected location, UE generates unexpected high-rate or heavy-traffic data, UE wakes up during an unexpected period, or UE accesses an incorrect destination address. The NWDAF network element may collect identifiers of the UEs in the abnormal states. The NWDAF network element may further collect the identifier of the abnormal state of the UE, and the identifier of the abnormal state is, for example, an ID used to indicate that the UE has the distributed denial of service (distributed denial of service, DDoS) attack behavior. The NWDAF network element may further collect a correspondence between UE in an abnormal state and an identifier of the abnormal state.

The foregoing application function AF network element (or referred to as an AF entity) may be configured to provide an application service. The application service may be provided by a third party, or may be provided by a carrier. For example, in this application, when the application service is a security detection service, the AF network element may include a firewall, an intrusion detection system, or the like. For example, the AF network element may be configured to detect UEs in abnormal states, and collect identifiers of the UEs in the abnormal states. The AF network element may further collect an identifier of the abnormal state of the UE.

Optionally, the 5G communication system in this application may include a security detection function (security detection function, SEDF). The security detection function may analyze traffic of UE and detects malicious traffic in the traffic. Based on the security detection function, an identifier of UE in an abnormal state and/or an identifier of the abnormal state of the UE may be collected. The foregoing AF network element or NWDAF network element may be configured to implement this function. For ease of description, the UE may be replaced with a terminal apparatus in this application. In addition, in this application, the UE that is in the abnormal state and that is collected by the AF network element and/or the NWDAF network element may be referred to as a first terminal apparatus.

In FIG. 1, Nnssf, Nnef, Nausf, Nnrf, Npcf, Mnwdaf, Nudm, Naf, Namf, Nsmf, N1, N2, N3, and N4, and N6 are interface sequence numbers. For meanings of the interface sequence numbers, refer to meanings defined in the 3GPP standard protocol. This is not limited herein.

For ease of description, in the following embodiments, the AMF network element may be described as an AMF, the SMF network element may be described as an SMF, the UPF network element may be described as a UPF, the NEF network element may be described as an NEF, the AF network element may be described as an AF, and the NWDAF may be described as an NWDAF.

Based on the communication system shown in FIG. 1, user plane data transmission paths of the UE may include a path 1: UE-RAN-UPF-DN. The user plane data transmission paths of the UE may further include a path 2: UE-RAN-NEF-AF. The UPF and/or the NEF may be referred to as data processing nodes/a data processing node in this application, and may be configured to process data sent by the UE. A DDoS attack is used as an example to describe a cause of occurrence of a congested state. When a large quantity of UEs are controlled by an attacker to initiate a large quantity of DDoS attacks to access the DN/the AF, user plane data of the large quantity of UEs is aggregated to the UPF and/or the NEF. Therefore, the UPF and/or the NEF may be congested.

The following describes the congestion control method provided in this application with reference to the communication system shown in FIG. 1. The control method may be performed by a control node, and the method may be used to reduce occupation of a data processing node by data when the data processing node is in a congested state. It should be understood that the control node in this application may include the SMF or the AMF shown in FIG. 1, and the data processing node in this application may include the UPF, the NEF, the AMF, and/or the SMF.

Figure 2:
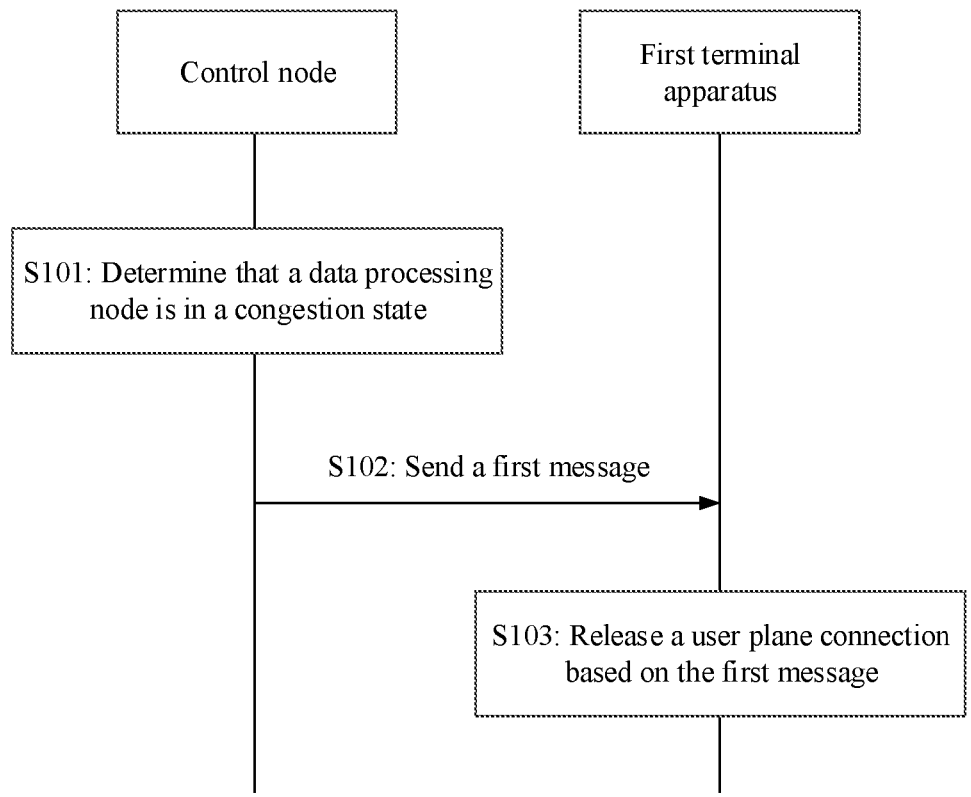
FIG. 2 is a flowchart of a congestion control method according to an embodiment of this application.

As shown in FIG. 2, this application provides a congestion control method. The method may include the following steps.

S101: A control node determines that a data processing node is in a congested state, where the data processing node is configured to process data sent by a terminal apparatus.

For example, the control node may receive an identifier of a first terminal apparatus from an AF and/or an NWDAF. The data processing node may include at least one of an AMF, an SMF, a UPF, or an NEF.

S102: The control node sends a first message to the first terminal apparatus corresponding to a terminal apparatus identifier in a list (or referred to as a blacklist) stored in the control node, where the terminal apparatus identifier in the list is the identifier that is of the first terminal apparatus in an abnormal state and that is received by the control node, the first message is used to indicate to release a user plane connection, and the user plane connection is used to transmit data of the first terminal apparatus The first terminal apparatus in this application is a terminal apparatus corresponding to the terminal apparatus identifier in the list stored in the control node.

Correspondingly, the first terminal apparatus receives the first message.

S103: The first terminal apparatus releases the user plane connection based on the first message.

According to the foregoing congestion control method, after the data processing node is in the congested state, the control node may release the user plane connection of the first terminal apparatus, to reduce occupation of the data processing node by the data sent by the first terminal apparatus, alleviate congestion of the data processing node, and avoid impact of congestion control on a terminal apparatus whose identifier is not included in the list.

During implementation of the foregoing procedure, the control node may receive an identifier of a second terminal apparatus from the AF network element and/or the NWDAF network element, where the second terminal apparatus described in this application is a terminal apparatus in the abnormal state. There may be one or more identifiers of second terminal apparatuses.

Each second terminal apparatus satisfies any one or more of the following conditions: A distributed denial of service DDoS attack exists in a user plane data transmission process of the second terminal apparatus; a target address of user plane data of the second terminal apparatus is incorrect; transmission duration of user plane data of the second terminal apparatus reaches threshold duration; a data length of user plane data of the second terminal apparatus reaches a threshold length; or a transmission rate of user plane data of the second terminal apparatus reaches a threshold rate.

For example, the control node may subscribe to an identifier of a terminal apparatus in the abnormal state from the AF network element and/or the NWDAF network element. For example, the control node may send a subscription request to the AF network element and/or the NWDAF network element, to request the AF network element and/or the NWDAF network element to send, after detecting a terminal apparatus in the abnormal state, an identifier of the terminal apparatus (namely, the second terminal apparatus) in the abnormal state to the control node. It should be understood that a manner in which the AF network element and/or the NWDAF network element detect/detects the terminal apparatus in the abnormal state is not limited in this application.

In addition, it should be understood that after S101, the control node may perform step S102 each time after receiving the identifier of the second terminal apparatus, or the control node may perform step S102 after a quantity of identifiers of first terminal apparatuses in the list reaches (or exceeds) a threshold. This is not limited in this application.

The control node may store the list based on the received identifier of the second terminal apparatus.

In an example, the control node may receive the identifier of the second terminal apparatus and an identifier of the abnormal state of the second terminal apparatus. When the identifier of the abnormal state indicates that the second terminal apparatus has a DDoS attack behavior and/or the UE generates unexpected high-rate or heavy-traffic data, the control node may store the identifier of the second terminal apparatus in the list. Otherwise, when the second terminal apparatus is in an abnormal state other than a state in which the second terminal apparatus has a DDoS attack, the control node does not store the identifier of the second terminal apparatus in the list. Therefore, when performing congestion control on a terminal apparatus in the list, the control node preferentially releases a user plane connection of a terminal apparatus that has a DDoS attack, to further improve congestion control precision, and avoid impact of the congestion control on a terminal apparatus that has no DDoS attack.

The identifier of the second terminal apparatus may be an identifier of one terminal apparatus, or may be identifiers of a group of terminal apparatuses. For example, the identifier of the second terminal apparatus may be one or a group of a subscription permanent identifier (subscription permanent identifier, SUPI), one or a group of a generic public subscription identifier (generic public subscription identifier, GPSI), one or a group of an internal group identifier, or one or a group of a tracking area code (tracking area code, TAC).

An identifier of an abnormal state is used to indicate an exception of a terminal, and may be used to indicate one or more abnormal states in which the UE has a distributed denial of service (distributed denial of service, DDoS) attack behavior, the UE is at an unexpected location, the UE generates unexpected high-rate or heavy-traffic data, the UE wakes up in an unexpected period, or the UE accesses an incorrect target address.

In an implementation, the control node may generate the list based on the identifier of the second terminal apparatus. Therefore, an identifier in the list may be used to identify a terminal apparatus in the abnormal state. It should be understood that the control node may store one or more lists, and each list may include at least one identifier. In this application, the terminal apparatus having the identifier included in the list may be referred to as the first terminal apparatus. When the control node stores one list, a terminal apparatus to which an identifier in the list belongs may be referred to as the first terminal apparatus; or when the control node stores a plurality of lists, terminal apparatuses to which identifiers separately included in the plurality of lists belong may be referred to as first terminal apparatuses.

In another implementation, the control node may record, in a context of the second terminal apparatus, an exception indication corresponding to the second terminal apparatus. For example, the exception indication may be the abnormal state of the second terminal apparatus, the identifier of the abnormal state, or indication information corresponding to the identifier of the abnormal state. Therefore, the second terminal apparatus can correspond to the abnormal state. The control node may find the context of the identified second terminal apparatus based on the identifier of the second terminal apparatus, and record the exception indication in the context. The exception indication is obtained based on the identifier of the abnormal state, and may be a binary bit, where 1 represents abnormal, and 0 represents normal. For example, when the identifier of the abnormal state indicates that the second terminal apparatus has a DDoS attack behavior and/or the UE generates unexpected high-rate or heavy-traffic data, the exception indication is recorded as 1. Alternatively, the control node directly records the abnormal state in the context, for example, stores the identifier of the abnormal state. Logically, the control node may obtain, based on contexts of all the second terminal apparatuses, a context in which a corresponding abnormal state is stored, to obtain a list, where a terminal apparatus to which an identifier in the list belongs may be referred to as the first terminal apparatus.

In an example, after receiving the identifier of the second terminal apparatus, if the data processing node is not in the congested state within first duration, the control node may delete the identifier of the second terminal apparatus from the list. Identifiers of different terminal apparatuses may correspond to same or different first duration.

For example, a correspondence between an identifier of a terminal apparatus in the list and first duration may be shown in Table 1. The control node may perform timing of the first duration based on Table 1, and after the timing of the first duration expires, the control node deletes, from the list, an identifier corresponding to the first duration whose timing expires. It should be understood that the correspondence shown in Table 1 is merely an example. The control node may randomly determine the first duration corresponding to the identifier of each terminal apparatus, or may determine, according to a protocol or through preconfiguration, the first duration corresponding to the identifier of each terminal apparatus. For example, for the identifier of the second terminal apparatus that is received for a plurality of times, the control node may set the first duration to be relatively long. As shown in Table 1, if the control node receives an identifier "ID_UE 1" of UE 1 for the first time, the control node may set the first duration to be relatively short to correspond to the identifier "ID_UE 1". For another example, if the control node receives an identifier "ID_UE 2" of a terminal apparatus UE 2 from the NWDAF for a plurality of times (for example, the plurality of times reaches or exceeds a quantity threshold), that is, the terminal apparatus causes a higher congestion probability of the data processing node, the control node may set the first duration to be relatively long to correspond to the identifier "ID_UE 2" of the terminal apparatus.

TABLE 1

| Identifier of terminal apparatuses in the list | First duration/Minute (min) |
|---|---|
| ID_ UE 1 | 1 |
| ID_ UE 2 | 2 |
| ID_ UE 3 | 1 |
| ... | ... |

For example, after storing the identifier in the list, the control node may perform timing of the first duration corresponding to the identifier of the terminal apparatus. For example, after the control node receives, from the NWDAF network element, the identifier "ID_UE 3" of the UE 3 and an ID used to indicate that the UE 3 has a DDoS attack and/or generates unexpected high-rate or heavy-traffic data, the control node stores the identifier "ID_UE 3" in the list, and starts a timer to perform 1-minute timing. Before the 1-minute timing expires, if the data processing node is not in the congested state, the control node may delete the identifier "ID_UE 3" from the list.

In another example, each list may correspond to second duration, and if the data processing node is not in the congested state within the second duration, the control node deletes the list corresponding to the second duration; or the control node deletes identifiers of all terminal apparatuses in the list corresponding to the second duration. Different lists may separately correspond to same or different second duration.

For example, a correspondence between a list and second duration may be shown in Table 2. The control node may perform timing of the second duration based on Table 2, and after the timing of the second duration expires, the control node deletes the list corresponding to the second duration, or deletes identifiers of all terminal apparatuses in the list corresponding to the second duration. It should be understood that the correspondence shown in Table 2 is merely an example. The control node may randomly determine the second duration corresponding to each list, or may determine, according to a protocol or through preconfiguration, the second duration corresponding to each list. For example, the control node may store, in a list, identifiers of second terminal apparatuses that are received for a relatively large quantity of times, and set the second duration to be relatively long to correspond to the list.

As shown in Table 2, if the control node receives an identifier "ID_UE 4" of UE 4 for the first time, the control node may store the identifier "ID_UE 4" in the list 1, and set the second duration to be relatively short to correspond to the list 1. For another example, the control node receives an identifier "ID_UE 5" of a terminal apparatus UE 5 from the NWDAF for a relatively large quantity of times (for example, the quantity of times reaches or exceeds a quantity threshold), that is, the terminal apparatus causes a higher probability of congestion of the data processing node, the control node may store the identifier "ID_UE 5" in the list 2, and set the second duration to be relatively long to correspond to the list 2.

TABLE 2

| List index (index) | Identifier of terminal apparatuses in a list | Second duration/Minute (min) |
|---|---|---|
| List 1 | ID_ UE 4 | 1 |
| | ... | |
| List 2 | ID_ UE 5 | 2 |
| | ... | |
| ... | ... | ... |

For example, after storing a new identifier in a list, the control node may perform timing of second duration corresponding to the list. For example, after the control node receives the identifier "ID_UE 4" of the UE 4 from the NWDAF network element, the control node stores the identifier "ID_UE 4" in the list 1, and starts a timer to perform 1-minute timing. Before the 1-minute timing expires, if the data processing node is not in the congested state, the control node may delete the list 1 or delete all identifiers in the list 1, where all the identifiers include the identifier "ID_UE 4".

Optionally, each time after the control node stores an identifier of a new terminal apparatus in a list, the control node may perform timing of second duration corresponding to the list again. For example, in the foregoing example, after the control node stores the identifier "ID_UE 4" in the list 1 and starts the timer to perform 1-minute timing, if the control node receives an identifier "ID_UE 6" of UE 6 from the NWDAF network element before the timing expires, the control node may store the identifier "ID_UE 6" in the list 1 and control the timer to perform 1-minute timing again.

During implementation of S101, the control node may determine, based on a received first indication, that the data processing node is in the congested state. For example, the first indication may include an identifier of the data processing node in the congested state.

In an example, the first indication may be used to indicate that the data processing node is in the congested state. After receiving the first indication, the control node may directly determine that the data processing node is in the congested state.

In another example, the first indication may be used to indicate a running status of the data processing node, for example, a central processing unit (central processing unit, CPU) usage or a data packet loss rate threshold. After receiving the first indication, the control node determines, based on the first indication in combination with a policy preconfigured in the control node, whether the data processing node is in the congested state. The policy preconfigured in the control node may include a running status threshold, for example, a CPU usage threshold and/or a data packet loss rate threshold.

In an example, when the control node includes an SMF, a UPF and/or an NEF may send the first indication to the control node after the UPF and/or the NEF are/is in the congested state. The UPF and/or the NEF that send/sends the first indication may further include identifiers/an identifier of the UPF and/or the NEF in the first indication.

Optionally, before receiving the first indication, the control node may further send a second indication to the data processing node.

Optionally, the second indication may be used to indicate the data processing node to send the first indication when the data processing node is in the congested state. Optionally, the first indication is used to indicate that the data processing node is in the congested state.

Alternatively, the second indication may be used to indicate the data processing node to send the first indication to the control node when the data processing node satisfies a condition for sending the first indication. Optionally, the first indication may be used to indicate a running status of the data processing node. The condition may be a specific periodicity, for example, a periodicity included in the second indication. Alternatively, the condition may be that a specific event occurs. For example, the data processing node may send, based on the second indication after CPU usage reaches (or exceeds) a usage threshold included in the second indication, a first indication used to indicate the CPU usage; and/or the data processing node may send, based on the second indication after a data packet loss rate reaches (or exceeds) a data packet loss rate threshold included in the second indication, a first indication used to indicate the data packet loss rate.

For example, the control node is the SMF and the data control node is the UPF. When establishing an N4 connection to the data processing node, the control node may send the second indication to the data processing node. When the data processing node determines that the data processing node is in the congested state, the data processing node sends the first indication to the control node based on the second indication. Alternatively, when the data processing node satisfies the condition, the data processing node may send, to the control node based on the second indication, the first indication used to indicate the running status.

For example, the control node is the SMF and the data control node is the NEF. When establishing an SMF-NEF connection to the data processing node NEF, the control node may send the second indication to the data processing node. For example, the control node SMF includes the second indication in an SM context creation request (Nnef SMContext_Create Request) message. When the data processing node is in the congested state, the data processing node sends the first indication to the control node based on the second indication. Alternatively, when the data processing node satisfies the condition for sending the first indication, the data processing node may send, to the control node based on the second indication, the first indication used to indicate the running status.

In another example, when the control node includes an AMF, an NEF may send the first indication to the AMF. After determining that the NEF is in the congested state, the NEF may send the first indication used to indicate that the data processing node is in the congested state. Before the NEF sends the first indication to the AMF, an SMF may send the second indication to the NEF, so that the NEF sends the first indication to the control node AMF after the NEF is in the congested state. Alternatively, when the NEF satisfies the condition for sending the first indication, the NEF may send, to the control node, the first indication used to indicate the running status. Before the NEF sends the first indication to the AMF, an SMF may send the second indication to the NEF, so that the NEF sends the first indication when the NEF satisfies the condition for sending the first indication. Optionally, in this example, the second indication may be sent by the AMF to the SMF, the AMF indicates the SMF to send the second indication, or the second indication may be sent by the SMF based on a local configuration. The second indication may include an identifier of the control node AMF. For example, when establishing an SMF-NEF connection to the data processing node NEF, the SMF may send the second indication to the NEF.

In another example, when the control node includes an AMF, a UPF and/or an NEF may send the first indication to an SMF, and the SMF sends the first indication to the control node AMF. After determining that the UPF and/or the NEF are/is in the congested state, the UPF and/or the NEF may send the first indication used to indicate that the UPF and/or the NEF are/is in the congested state. Before the UPF and/or the NEF send/sends the first indication to the SMF, the SMF may send the second indication to the UPF and/or NEF, so that the UPF and/or the NEF send/sends the first indication to the control node AMF after the UPF and/or the NEF are/is in the congested state. Alternatively, when the UPF and/or the NEF satisfy/satisfies the condition for sending the first indication, the UPF and/or the NEF may send, to the control node AMF, the first indication used to indicate the running status. Before the UPF and/or the NEF send/sends the first indication to the SMF, the SMF may send the second indication to the UPF and/or NEF, so that the UPF and/or the NEF send/sends the first indication when the UPF and/or the NEF satisfy/satisfies the condition for sending the first indication. Optionally, in this example, the second indication may be sent by the AMF to the SMF, the AMF indicates the SMF to send the second indication, or the second indication may be sent by the SMF based on a local configuration. The second indication may include an identifier of the control node AMF. For example, when establishing an N4 connection to the UPF, the SMF may send the second indication to the data processing node.

During implementation of this application, the control node may further determine, based on a received third indication, that the data processing node is not in the congested state. For example, the third indication may include the identifier of the data processing node.

In an example, the third indication may be used to indicate that the data processing node is not in the congested state. The third indication may be sent after the data processing node determines that the data processing node is not in the congested state. For example, if the data processing node is in the congested state for a long time, but does not enter a non-congested state from the congested state, the data processing node may not send the third indication.

In another example, the third indication may be used to indicate a running status of the data processing node, for example, CPU usage or a data packet loss rate. After receiving the third indication, the control node determines, based on the third indication in combination with a policy preconfigured in the control node, whether the data processing node is not in the congested state.

For a sending manner of the third indication, refer to the foregoing sending manner of the first indication. Details are not described herein again.

For example, before receiving the third indication, the control node may further send a fourth indication to the data processing node.

The fourth indication may be used to indicate the data processing node to send the third indication when the data processing node is not in the congested state. Optionally, the third indication may be used to indicate that the data processing node is not in the congested state.

Alternatively, the fourth indication may be used to indicate the data processing node to send the third indication when the data processing node satisfies a condition for sending the third indication. Optionally, the third indication may be used to indicate the running status of the data processing node. The condition may be a specific periodicity, for example, a periodicity included in the fourth indication. Alternatively, the condition may be that a specific event occurs. For example, the data processing node may report, based on the fourth indication, CPU usage after the CPU usage does not reach (or is less than) a usage threshold included in the fourth indication; and/or the data processing node may report, based on the fourth indication, a data packet loss rate after the data packet loss rate does not reach (or is less than) a data packet loss rate threshold included in the fourth indication. It should be understood that the usage threshold included in the fourth indication may be the same as or different from the usage threshold included in the second indication. The data packet loss rate threshold included in the fourth indication may be the same as or different from the data packet loss rate threshold included in the second indication.

For a sending manner of the fourth indication, refer to the foregoing sending manner of the second indication. Details are not described herein again.

For example, the data processing node may determine, based on processor usage and/or a packet loss rate of the data processing node, whether the data processing node is in the congested state. When CPU usage of the data processing node reaches (or exceeds) a first usage threshold (for example, 90%), the data processing node determines that the data processing node is in the congested state. In addition, when a packet loss rate at which the data processing node forwards data sent by a terminal apparatus reaches (or exceeds) a first packet loss rate threshold (for example, 10%), the data processing node may determine that the data processing node is in the congested state.

The first usage threshold and/or the first packet loss rate threshold may be defined according to a protocol or through preconfiguration. In addition, the first usage threshold and/or the first packet loss rate threshold may also be indicated by the control node. For example, the first usage threshold and/or the first packet loss rate threshold may be carried in the second indication.

Optionally, the first usage threshold may be the same as or different from the CPU usage threshold corresponding to the second indication. The first packet loss rate threshold may be the same as or different from the data packet loss rate threshold corresponding to the second indication.

In addition, when CPU usage of the data processing node is less than (or does not exceed) a second usage threshold, the data processing node determines that the data processing node is not in the congested state. In addition, when a packet loss rate at which the data processing node forwards data sent by a terminal apparatus is less than (or does not exceed) a second packet loss rate threshold, the data processing node may determine that the data processing node is not in the congested state. After determining that the data processing node is not in the congested state, the data processing node may send the third indication to the control node, where the third indication is used to indicate that the data processing node is not in the congested state. The third indication may include the identifier of the data processing node.

The second usage threshold and/or the second packet loss rate threshold may be defined according to a protocol or through preconfiguration. In addition, the second usage threshold and/or the second packet loss rate threshold may also be indicated by the control node. For example, the second usage threshold and/or the second packet loss rate threshold may be carried in the fourth indication. It should be understood that the first usage threshold may be the same as or different from the second usage threshold. The first packet loss rate threshold may be the same as or different from the second packet loss rate threshold.

Optionally, the second usage threshold may be the same as or different from the CPU usage threshold corresponding to the fourth indication. The second packet loss rate threshold may be the same as or different from the data packet loss rate threshold corresponding to the fourth indication.

Data of first terminal devices that are in abnormal states and that are detected by the AF/NWDAF is relatively large generally and is not suitable for distributed storage, and the terminal devices in the abnormal states also need to be processed in a centralized manner. Therefore, an independent control node is introduced to reduce storage overheads of the terminal devices in an entire network, and facilitate processing of the abnormal terminal devices in the centralized manner. The data processing node may notify the control node to process a large quantity of terminal device in abnormal states. This notification manner may use relatively low signaling overheads, so that storage overheads and processing overheads of the data processing node are reduced.

In S102, if there are a plurality of first terminal apparatuses, the control node may separately send the first message to the plurality of first terminal apparatuses.

In an example, the first message may include an identifier of the user plane connection. In this case, the first message may be used to indicate the first terminal apparatus to release the user plane connection to which the identifier belongs. The first terminal apparatus may release, based on the first message, the user plane connection to which the identifier belongs.

For example, if there are a plurality of data processing nodes in the congested state, the control node may determine, based on an identifier (for example, a DNN) of a data network supported by at least two of the plurality of data processing nodes, one or more user plane connections that accesses the data network in user plane connections of the first terminal apparatus, and includes identifiers of the one or more user plane connections in the first message, to indicate the first terminal apparatus to release the one or more user plane connections.

The identifier of the data network supported by the data processing node means that the data processing node supports establishment of a user plane connection to the data network to which the identifier belongs. The identifier of the data network supported by the data processing node may be included in a context of the data processing node. The context of the data processing node may be stored in an SMF connected to the data processing node.

The following uses an example in which the control node includes an SMF or an AMF for description.

If the control node includes the SMF, the control node may determine, based on respective contexts that are of a plurality of data processing nodes and that are stored in the control node, identifiers of data networks respectively supported by the plurality of data processing nodes, and use an identifier of a data network that is jointly supported by at least two data processing nodes and that is in the identifiers of the data networks as an identifier of a data network supported by at least two of the plurality of data processing nodes.

For example, if the SMF is the control node, the SMF stores contexts of UPFs such as a UPF_1, a UPF_2, and a UPF_3, and when data processing nodes in the congested state include the UPF_1, the UPF_2, and the UPF_3, the SMF may determine, based on respective contexts of the UPF_1, the UPF_2, and the UPF_3, a correspondence between an identifier of a data processing node and a DNN of a data network supported by the data processing node. For example, the correspondence is shown in Table 3.

TABLE 3

| Identifier of a data processing node | DNN of a data network supported by the data processing node |
|---|---|
| ID_ UPF_1 | DNN_1 and DNN_2 |
| ID_ UPF_2 | DNN_3 |
| ID_ UPF_3 | DNN_1 and DNN_3 |

The SMF may determine, based on Table 3, that identifiers of data networks supported by at least two data processing nodes in the UPF_1, the UPF_2, and the UPF_3 are the DNN_1 and the DNN_3.

Further, the SMF may query a context of the first terminal apparatus, to obtain all user plane connections of the first terminal apparatus. The SMF may include, in the first message, user plane connections that are in all the user plane connections of the first terminal apparatus and that are used to access the DNN_1 and the DNN_3. The context of the first terminal apparatus may be stored in the SMF.

If the control node includes the AMF, the AMF may receive, from an SMF, identifiers of data networks respectively supported by a plurality of data processing nodes, and use an identifier of a data network that is jointly supported by at least two data processing nodes and that is in the identifiers of the data networks as an identifier of a data network supported by at least two of the plurality of data processing nodes.

The SMF may separately receive congestion indications from a plurality of data processing nodes in the congested state, where the congestion indication may be used to indicate that the data processing node is in the congested state. The congestion indication may include the first indication in this application. The SMF may determine, based on the respective contexts that are of the plurality of data processing nodes and that are stored in the SMF, the identifiers of the data networks respectively supported by the plurality of data processing nodes, and use the identifier of the data network that is jointly supported by the at least two data processing nodes and that is in the identifiers of the data networks as the identifier of the data network supported by the at least two of the plurality of data processing nodes. For example, the SMF may include, in the first indication, the identifier of the data network supported by the at least two data processing nodes, and send the first indication to the AMF. Alternatively, the SMF may separately send, to the AMF by using different messages, the first indication and the identifier of the data network supported by the at least two data processing nodes.

Table 3 is still used as an example. When the SMF receives congestion indications respectively from a UPF_1, a UPF_2, and a UPF_3, the SMF may determine, based on a correspondence in Table 3, that identifiers of data networks supported by at least two data processing nodes in the UPF_1, the UPF_2, and the UPF_3 are the DNN_1 and the DNN_3. Then, the SMF may include the DNN_1 and the DNN_3 in the first indication, and send the first indication to the AMF. The first indication may further include the identifiers of the UPF_1, the UPF_2, and the UPF_3, to indicate that the UPF_1, the UPF_2, and the UPF_3 are in the congested state.

Further, the AMF may query a context of the first terminal apparatus, to obtain all user plane connections of the first terminal apparatus. The AMF may include, in the first message, user plane connections that are in all the user plane connections of the first terminal apparatus and that are used to access the DNN_1 and the DNN_3. The context of the first terminal apparatus may be stored in the AMF.

In another example, the first message may be used to indicate the first terminal apparatus to release all user plane connections. For example, when the first message does not include an identifier of the user plane connection, the first message may be used to indicate the first terminal apparatus to release all the user plane connections.

During implementation of S102, the first message may carry indication information (which may be referred to as a fifth indication in this application), and the fifth indication may be used to indicate the first terminal apparatus not to send a response message corresponding to the first message, to reduce impact of the response message corresponding to the first message on the data processing node.

It should be understood that the user plane connection may be a PDU session, and the first message may be a PDU session release message.

If the control node is an SMF, the first message may be carried in a NAS session management (session management, SM) message.

If the control node is an AMF, the first message may be carried in a NAS message.

During implementation of this application, after S101, if the control node includes the SMF, after receiving a first user plane connection establishment request from the first terminal apparatus, the control node may send, to the first terminal apparatus, a reject response corresponding to the first user plane connection establishment request, to indicate that establishing a user plane connection of the first terminal apparatus based on the user plane connection establishment request is rejected. Therefore, after the data processing node is in the congested state, the SMF prohibits the first terminal apparatus from establishing a new user plane connection, to reduce occupation of the data processing node by the first terminal apparatus.

The reject response may be further used to indicate the first terminal apparatus not to send the user plane connection establishment request within third duration. The reject response may include the third duration, or include information used to indicate the third duration. In addition, the third duration may alternatively be determined according to a protocol or through preconfiguration.

Further, after the control node receives the third indication, after the control node determines that the data processing node is not in the congested state, the control node does not prohibit the first terminal apparatus from establishing a new user plane connection. After receiving the third indication, if receiving a second user plane connection establishment request from the first terminal apparatus, the control node may send, to the first terminal apparatus, an accept response corresponding to the second user plane connection establishment request, to indicate that establishing a user plane connection of the first terminal apparatus based on the second user plane connection establishment request is accepted.

For example, the foregoing reject response may carry indication information, to indicate the first terminal apparatus not to send a response message corresponding to the reject response, to reduce impact of the response message corresponding to the reject response on the data processing node.

The reject response may be carried in a NAS SM message.

In addition, after S101, if the control node includes the AMF, after receiving a first signaling connection establishment request from the first terminal apparatus, the control node may send, to the first terminal apparatus, a reject response corresponding to the first signaling connection establishment request, to indicate that establishing a signaling connection of the first terminal apparatus based on the signaling connection establishment request is rejected. Therefore, after the data processing node is in the congested state, the AMF prohibits the first terminal apparatus from establishing a new signaling connection, to reduce occupation of the data processing node by the first terminal apparatus.

The reject response may be further used to indicate the first terminal apparatus not to send the signaling connection establishment request within fourth duration. The reject response may include the fourth duration, or include information used to indicate the fourth duration. In addition, the fourth duration may alternatively be determined according to a protocol or through preconfiguration.

Further, after the control node receives the third indication, after the control node determines that the data processing node is not in the congested state, the control node does not prohibit the first terminal apparatus from establishing a new signaling connection. After receiving the third indication, if receiving a second signaling connection establishment request from the first terminal apparatus, the control node may send, to the first terminal apparatus, an accept response corresponding to the second signaling connection establishment request, to indicate that establishing a signaling connection of the first terminal apparatus based on the second signaling connection establishment request is accepted.

For example, the foregoing reject response may carry indication information, to indicate the first terminal apparatus not to send a response message corresponding to the reject response, to reduce impact of the response message corresponding to the reject response on the data processing node.

The reject response may be carried in a NAS message.

During implementation of this application, after S101, if the control node includes the AMF, the control node may further send a second message to the first terminal apparatus, where the second message may be used to indicate to set a location of the first terminal apparatus to an unsupported area, and the unsupported area does not support the first terminal apparatus in requesting to establish a signaling connection. Therefore, the AMF may enable, by using the second message, the first terminal apparatus to perform configuration, to indicate the first terminal apparatus to not request to establish a new signaling connection, to reduce impact of a new signaling connection establishment process on the data processing node.

For example, the second message may include a UE configuration update message, to indicate the first terminal apparatus to update a mobility restriction (mobility restriction) list. The AMF may set, by using the second message, a current location of the first terminal apparatus in the mobility restriction list to a non-allowed area (non-allowed area), and the first terminal apparatus updates a configuration based on the mobility restriction list, to set the location of the first terminal apparatus to the unsupported area.

For example, the second message may carry indication information, to indicate the first terminal apparatus not to send a response message corresponding to the second message, to reduce impact of the response message corresponding to the second message on the data processing node.

The second message may be carried in a NAS message.

During implementation of this application, after S101, if the control node includes the SMF, the control node may further send a third message to the first terminal apparatus, where the third message may be used to indicate to set a QoS level corresponding to a user plane connection of the first terminal apparatus to a first QoS level, and the first QoS level is lower than a current QoS level of the user plane connection. Therefore, occupation of the data processing node by the first terminal apparatus may be reduced by reducing quality of service of the first terminal apparatus.

The first QoS level may be a preset QoS level. For example, the first QoS level is a QoS level representing lowest QoS. Alternatively, the first QoS level may be a QoS level determined based on the current QoS level of the user plane connection. For example, the first QoS level is a QoS level that is N levels lower than the current QoS level of the user plane connection, where N is a positive integer. In addition, the second message may carry information used to indicate the first QoS level, for example, carry an identifier of the first QoS level, to indicate the first QoS level.

In an implementation, the third message may carry an identifier of the user plane connection, and is used to indicate the abnormal terminal apparatus to set, to the first QoS level, the QoS level of the user plane connection to which the identifier belongs. For a manner in which the SMF determines the identifier of the user plane connection, refer to the descriptions about the foregoing manner in which the SMF determines the identifier of the user plane connection in the first message.

In another implementation, the third message may be used to indicate the first terminal apparatus to set QoS levels of all user plane connections of the first terminal apparatus to a first QoS level. For example, when the third message does not include an identifier of the user plane connection, the third message may be used to indicate the first terminal apparatus to set the QoS levels of all the user plane connections to the first QoS level.

For example, the third message may carry a policy and charging control (Policy and Charging Control, PCC) rule, and the PCC rule is used to indicate the abnormal terminal apparatus to reduce the QoS level of the user plane connection. In addition, the SMF may further send the PCC rule to the data processing node, so that the data processing node reduces a QoS level of a corresponding user plane connection according to the PCC rule, and provides a service for the abnormal terminal apparatus based on the reduced QoS level.

For example, the third message may carry indication information, to indicate the first terminal apparatus not to send a response message corresponding to the third message, to reduce impact of the response message corresponding to the third message on the data processing node.

It should be understood that the user plane connection may be a PDU session, and the third message may be a PDU session modification message.

The third message may be carried in a NAS SM message.

In addition, if the control node and the data node are a same node, for example, are an SMF, after determining that the SMF is in the congested state, the SMF may perform S102 to send the first message to the first terminal apparatus, where the first message may include content sent by the SMF in S102 described in the foregoing embodiment. If the control node and the data node are an AMF, after determining that the AMF is in the congested state, the AMF may perform S102 to send the first message to the first terminal apparatus, where the first message may include content sent by the AMF in S102 described in the foregoing embodiment.

Figure 3:
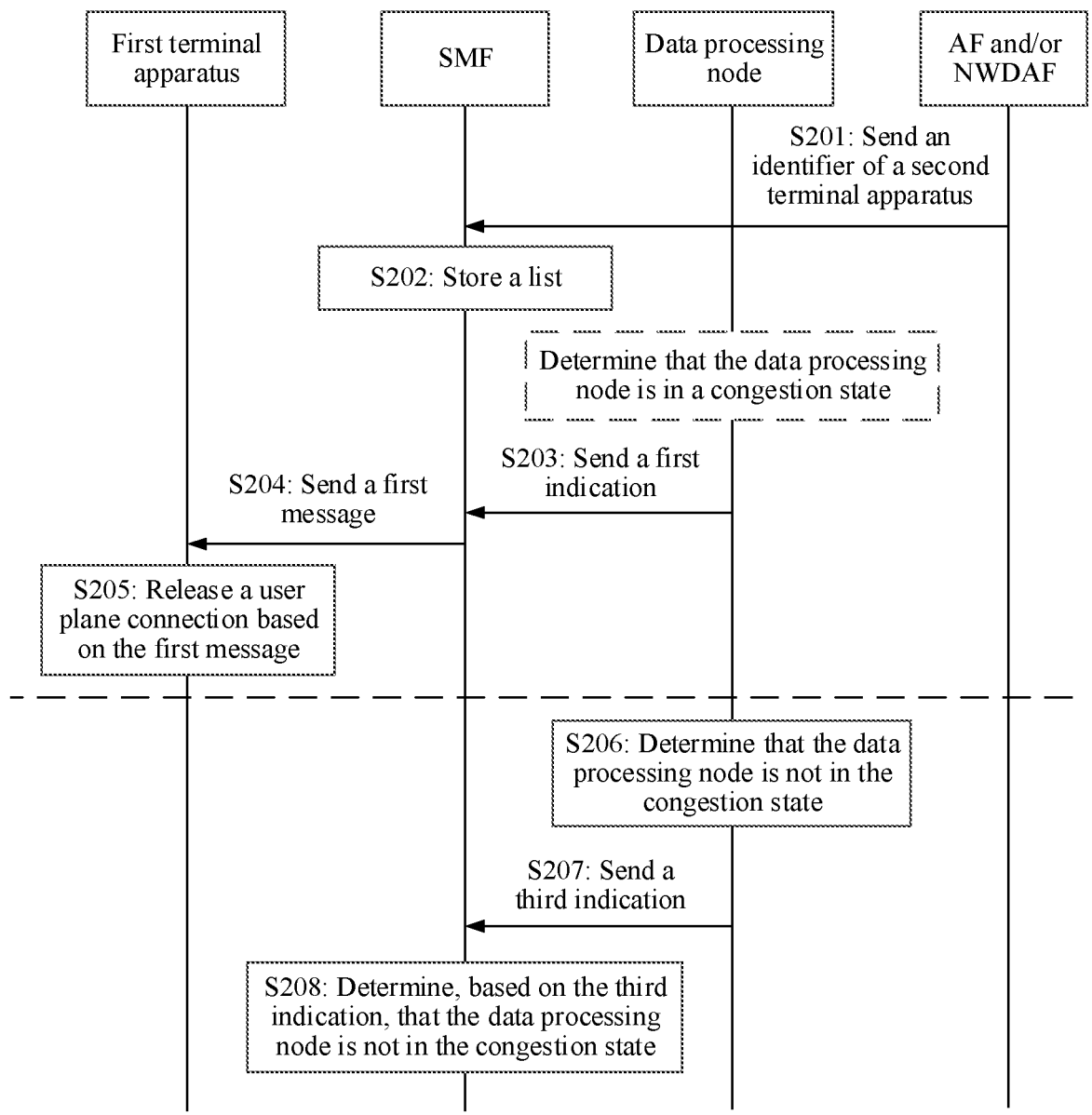
FIG. 3 is a flowchart of another congestion control method according to an embodiment of this application.

With reference to FIG. 3, the following describes a congestion control method according to an embodiment of this application when a control node includes an SMF. In the congestion control method, the SMF may perform congestion control in response to a congested state of a data processing node, to reduce occupation of the data processing node by data.

As shown in FIG. 3, when the SMF performs the foregoing congestion control method, the congestion control method according to this embodiment of this application may include the following steps.

S201: An AF and/or an NWDAF send/sends an identifier of a second terminal apparatus to the SMF.

Correspondingly, the SMF receives the identifier of the second terminal apparatus from the AF and/or the NWDAF.

Optionally, the SMF may further receive, from the AF and/or the NWDAF, an identifier of an abnormal state of the second terminal apparatus.

In an example, the NWDAF may detect, according to a conventional technology, that one or more terminal apparatuses have DDoS attacks or other abnormal behaviors. The one or more terminal apparatuses that have abnormal behaviors herein are second terminal apparatuses, and the NWDAF may send the identifier of the second terminal apparatus to the SMF. In this case, a terminal apparatus ID may be an internal mobile network identifier, for example, an SUPI, an international mobile equipment identity (international mobile equipment identity, IMEI), an internal group identifier (internal group ID), or a tracking area code (tracking area code, TAC). An SEDF may further send an abnormal behavior ID to the SMF, for example, an ID used to indicate an abnormal behavior of a terminal apparatus.

In another example, when the AF is a security detection device such as a firewall or an intrusion detection system, the AF may detect, by using a security detection algorithm based on user plane data that flows through the AF, traffic that has a security threat. In this case, the AF first detects an external identity of the malicious traffic, such as an IP address or a GPSI, and then sends the external identity to an NEF. The NEF maps the external identity as an internal identity of the second terminal apparatus. The internal identity herein is, for example, an SUPI, an IMEI, an internal group ID, or a TAC. Then, the NEF may send the internal identity of the second terminal apparatus to the SMF. Optionally, the AF may further send an abnormal behavior ID the SMF, to manage second terminal apparatuses having the same abnormal behavior ID.

S202: The SMF stores a list, where the list includes the identifier of the second terminal apparatus.

The list may include the identifier of the second terminal apparatus.

S203: After determining that a data processing node is in a congested state, the data processing node sends a first indication to the SMF, to indicate that the data processing node is in the congested state.

Correspondingly, the SMF receives the first indication from the data processing node, and determines, based on the first indication, that the data processing node is in the congested state.

Optionally, the first indication may include an identifier of the data processing node.

The data processing node may include a UPF and/or an NEF.

Before S203 is performed, the SMF may further send a second indication to the data processing node, to indicate the data processing node to send the first indication to the SMF after the data processing node is in the congested state. For example, the second indication may include a first usage threshold and/or a first packet loss rate threshold.

S204: The SMF sends a first message to a first terminal apparatus corresponding to a terminal apparatus identifier in the list, where the first message is used to indicate the first terminal apparatus to release a user plane connection.

Correspondingly, the first terminal apparatus receives the first message.

For example, the first message may carry an identifier of the user plane connection.

The SMF may select, based on the list shown in S202, one or more first terminal apparatuses from terminal apparatuses to which identifiers in the list belong, and send the first message to the one or more first terminal apparatuses. According to the method shown in S202, when timing reaches particular duration, the SMF may delete an identifier corresponding to the duration from the list, or may delete the list corresponding to the duration. Therefore, the SMF may control, in a period of continued existence of the list and the identifiers in the list, the first terminal apparatus to which the identifier in the list belongs. In addition, after timing corresponding to an identifier in the list expires, it may be considered that a terminal apparatus to which the identifier belongs causes a relatively low congestion probability of the data processing node. Therefore, the identifier may be deleted from the list. Alternatively, after timing of second duration expires, the SMF may delete the entire list corresponding to the second duration, or delete all identifiers from the list.

The first message may carry a fifth indication, and the fifth indication may be used to indicate the first terminal apparatus not to send a response message corresponding to the first message.

After determining, based on S203, that the data processing node is in the congested state, if the SMF receives a user plane establishment request from the first terminal apparatus, the SMF may send a reject response corresponding to the user plane establishment request to the first terminal apparatus. Further, the reject response corresponding to the user plane establishment request may be further used to indicate the first terminal apparatus not to send the user plane establishment request within third duration.

In addition, during implementation, the SMF may alternatively replace the first message with a third message, where the third message is used to indicate to set a QoS level corresponding to a user plane connection of the first terminal apparatus to a first QoS level. The third message may further carry an identifier of the user plane connection.

The third message may carry indication information, and the indication information may be used to indicate the first terminal apparatus not to send a response message corresponding to the third message.

S205: The first terminal apparatus releases the user plane connection based on the first message.

When the first message includes the identifier of the user plane connection, the first terminal apparatus may release the user plane connection to which the identifier belongs. Alternatively, when the first message does not include the identifier of the user plane connection, the first terminal apparatus may release all user plane connections of the first terminal apparatus.

If the first message includes the fifth indication, the first terminal apparatus may further skip, in response to the fifth indication, sending the response message corresponding to the first message to the SMF.

In addition, if the first message is replaced with the third message, the first terminal apparatus may set, based on the third message, the QoS level corresponding to the user plane connection of the first terminal apparatus to the first QoS level. When the third message includes the identifier of the user plane connection, the first terminal apparatus may set, to the first QoS level, the QoS level of the user plane connection to which the identifier belongs. Alternatively, when the third message does not include the identifier of the user plane connection, the first terminal apparatus may set QoS levels of all the user plane connections to the first QoS level.

If the third message includes the indication information, the first terminal apparatus may skip, in response to the indication information, sending the response message corresponding to the third message to the SMF.

Optionally, after S205, the following steps may be further performed:

S206: The data processing node determines that the data processing node is not in the congested state.

S207: The data processing node sends a third indication to the SMF, where the third indication may be used to indicate that the data processing node is not in the congested state.

Before S207 is performed, the SMF may further send a fourth indication to the data processing node, to indicate the data processing node to send the third indication to the SMF when the data processing node is not in the congested state. For example, the fourth indication may include a second usage threshold and/or a second packet loss rate threshold.

S208: The SMF determines, based on the third indication, that the data processing node is not in the congested state.

For example, after determining that the data processing node is not in the congested state, the SMF does not prohibit establishing a user plane connection of the first terminal apparatus.

If the SMF receives a user plane connection establishment request from the first terminal apparatus, the SMF may send, to the first terminal apparatus, an accept response corresponding to the user plane connection establishment request.

For example, the SMF may perform S208 after a part of or all of data processing nodes in the congested state in S203 are not in the congested state.

Figure 4A:
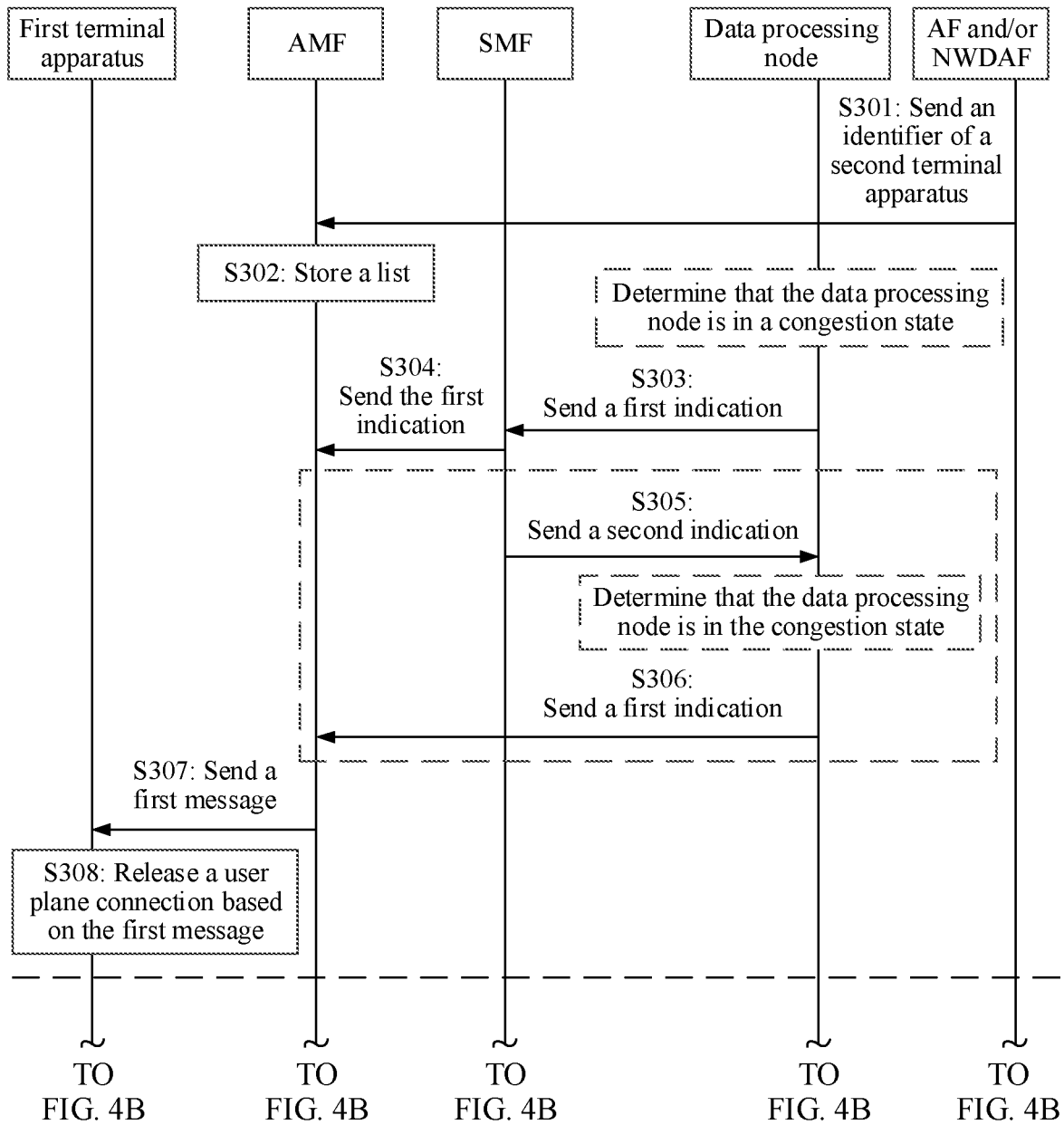
FIG. 4A and FIG. 4B are flowcharts of another congestion control method according to an embodiment of this application.
Figure 4B:
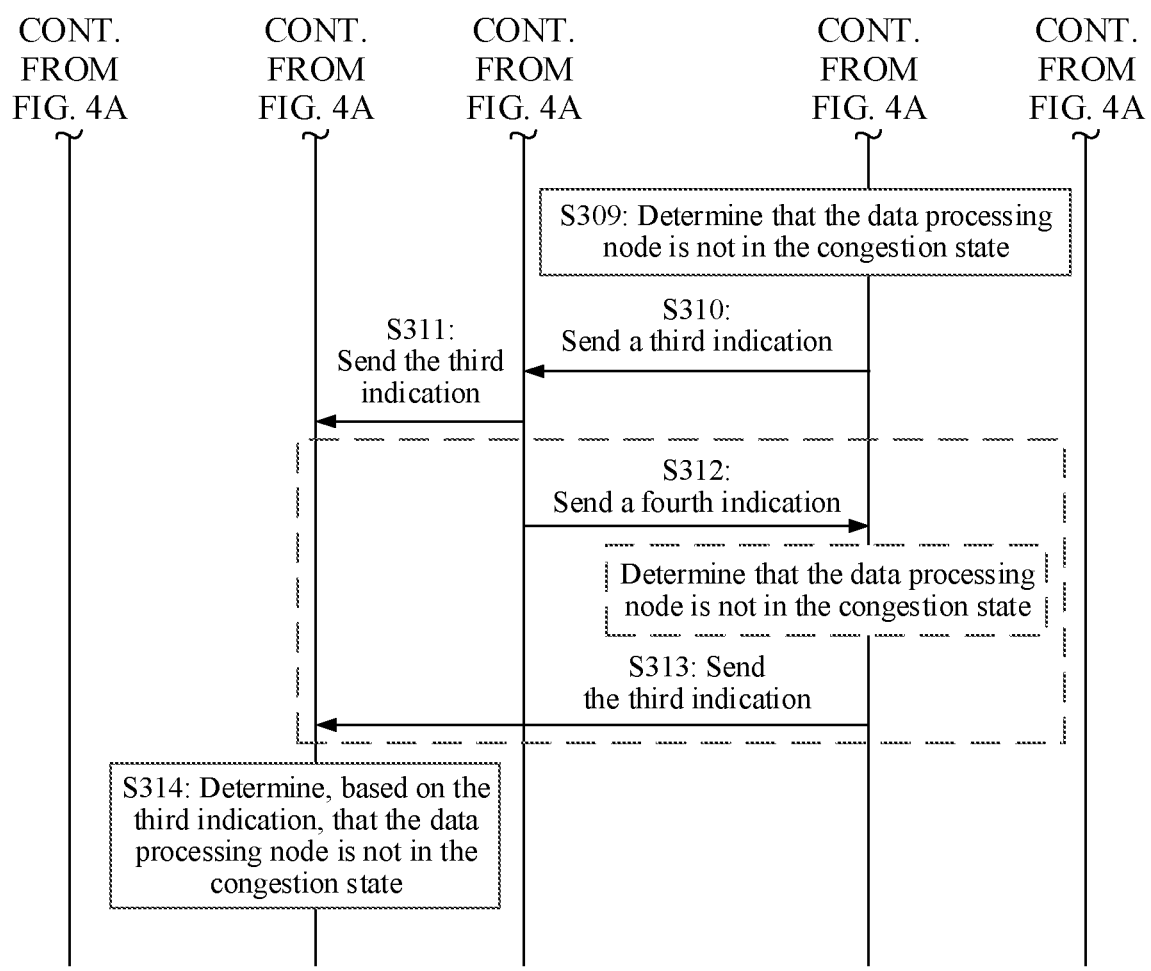

With reference to FIG. 4A and FIG. 4B, the following describes a congestion control method according to an embodiment of this application when a control node includes an AMF. In the congestion control method, the AMF may perform congestion control in response to a congested state of a data processing node, to reduce occupation of the data processing node by data.

As shown in FIG. 4A and FIG. 4B, when the AMF performs the congestion control method, the congestion control method according to this embodiment of this application may include the following steps.

S301: An AF and/or an NWDAF send/sends an identifier of a second terminal apparatus to the AMF.

Correspondingly, the AMF receives the identifier of the second terminal apparatus from the AF and/or the NWDAF.

Optionally, the AMF may further receive, from the AF and/or the NWDAF, an identifier of an abnormal state of the second terminal apparatus.

For a manner in which the NWDAF and/or the AF determine/determines the identifier of the second terminal apparatus, refer to the foregoing descriptions.

S302: The AMF stores a list, where the list includes the identifier of the second terminal apparatus.

S303: After determining that a data processing node is in a congested state, the data processing node sends a first indication to an SMF, where the first indication is used to indicate that the data processing node is in the congested state. The first indication may include an identifier of the data processing node in the congested state.

Correspondingly, the SMF receives the first indication from the data processing node.

The data processing node may include a UPF and/or an NEF.

Before S303 is performed, the SMF may send a second indication to the data processing node, where the second indication is used to indicate the data processing node to send the first indication to the SMF after the data processing node is in the congested state. For example, the second indication may include a first usage threshold and/or a first packet loss rate threshold.

S304: The SMF sends the first indication to the AMF.

Correspondingly, the AMF receives the first indication, and determines, based on the first indication, that the data processing node is in the congested state.

In addition, if the data processing node includes the NEF, the S303 and S304 may alternatively be replaced with S305 and S306.

S305: An SMF sends a second indication to the data processing node. The second indication includes an identifier of the AMF. The second indication is used to indicate the data processing node to send a first indication to the AMF after the data processing node is in the congested state.

S306: After determining that the data processing node is in the congested state, the data processing node sends the first indication to the AMF based on the second indication, where the first indication is used to indicate that the data processing node is in the congested state.

Correspondingly, the AMF receives the first indication, and determines, based on the first indication, that the data processing node is in the congested state.

S307: The AMF sends a first message to a first terminal apparatus corresponding to a terminal apparatus identifier in the list, where the first message is used to indicate the first terminal apparatus to release a user plane connection.

Correspondingly, the first terminal apparatus receives the first message.

For example, the first message may carry an identifier of the user plane connection.

The first message may carry a fifth indication, and the fifth indication may be used to indicate the first terminal apparatus not to send a response message corresponding to the first message.

After determining, based on S304 or S306, that the data processing node is in the congested state, if the AMF receives a signaling request from the first terminal apparatus, the AMF sends a reject response corresponding to the signaling establishment request to the first terminal apparatus. Further, the reject response corresponding to the signaling establishment request may be further used to indicate the first terminal apparatus not to send the signaling establishment request within fourth duration.

After determining, based on S304 or S306, that the data processing node is in the congested state, the AMF may send a second message to the first terminal apparatus, where the second message may be used to indicate to set a location of the first terminal apparatus to an unsupported area, and the unsupported area does not support the first terminal apparatus in requesting to establish a signaling connection.

The second message may carry indication information, and the indication information may be used to indicate the first terminal apparatus not to send a response message corresponding to the first message.

S308: The first terminal apparatus releases the user plane connection based on the first message.

When the first message includes the identifier of the user plane connection, the first terminal apparatus may release the user plane connection to which the identifier belongs. Alternatively, when the first message does not include the identifier of the user plane connection, the first terminal apparatus may release all user plane connections of the first terminal apparatus.

If the first message includes the fifth indication, the first terminal apparatus may further skip, in response to the fifth indication, sending the response message corresponding to the first message to the SMF.

In addition, if the first terminal apparatus receives the second message from the AMF, the first terminal apparatus may set the location of the first terminal apparatus to the unsupported area based on the second message, so that the signaling connection establishment request is not sent.

Optionally, after S308, the following steps may be further performed:

S309: The data processing node determines that the data processing node is not in the congested state.

S310: The data processing node sends a third indication to the SMF, where the third indication may be used to indicate that the data processing node is not in the congested state. The third indication may include the identifier of the data processing node.

Correspondingly, the SMF receives the first indication from the data processing node.

Before S310 is performed, the SMF may further send a fourth indication to the data processing node, to indicate the data processing node to send the third indication to the SMF when the data processing node is not in the congested state.

S311: The SMF sends the third indication to the AMF.

Correspondingly, the AMF receives the third indication.

In addition, if the data processing node includes the NEF, S309 to S311 may alternatively be replaced with S312 and S313.

S312: The SMF sends a fourth indication to the data processing node. The fourth indication includes the identifier of the AMF. The fourth indication is used to indicate the data processing node to send a third indication to the AMF when the data processing node is not in the congested state.

S313: After determining that the data processing node is not in the congested state, the data processing node sends a third indication to the AMF based on the fourth indication, where the third indication is used to indicate that the data processing node is in the congested state. The third indication may include the identifier of the data processing node.

Correspondingly, the AMF receives the third indication.

S314: The AMF determines, based on the third indication, that the data processing node is not in the congested state.

The third indication may be received by the AMF in S311 or S313.

For example, after determining that the data processing node is not in the congested state, the AMF does not prohibit establishing a signaling connection of the first terminal apparatus. If the AMF receives a signaling establishment request from the first terminal apparatus, the AMF may send, to the first terminal apparatus, an accept response corresponding to the signaling establishment request.

For example, the AMF may perform S313 after a part of or all of data processing nodes in the congested state in S304 or S306 are not in the congested state.

Figure 5:
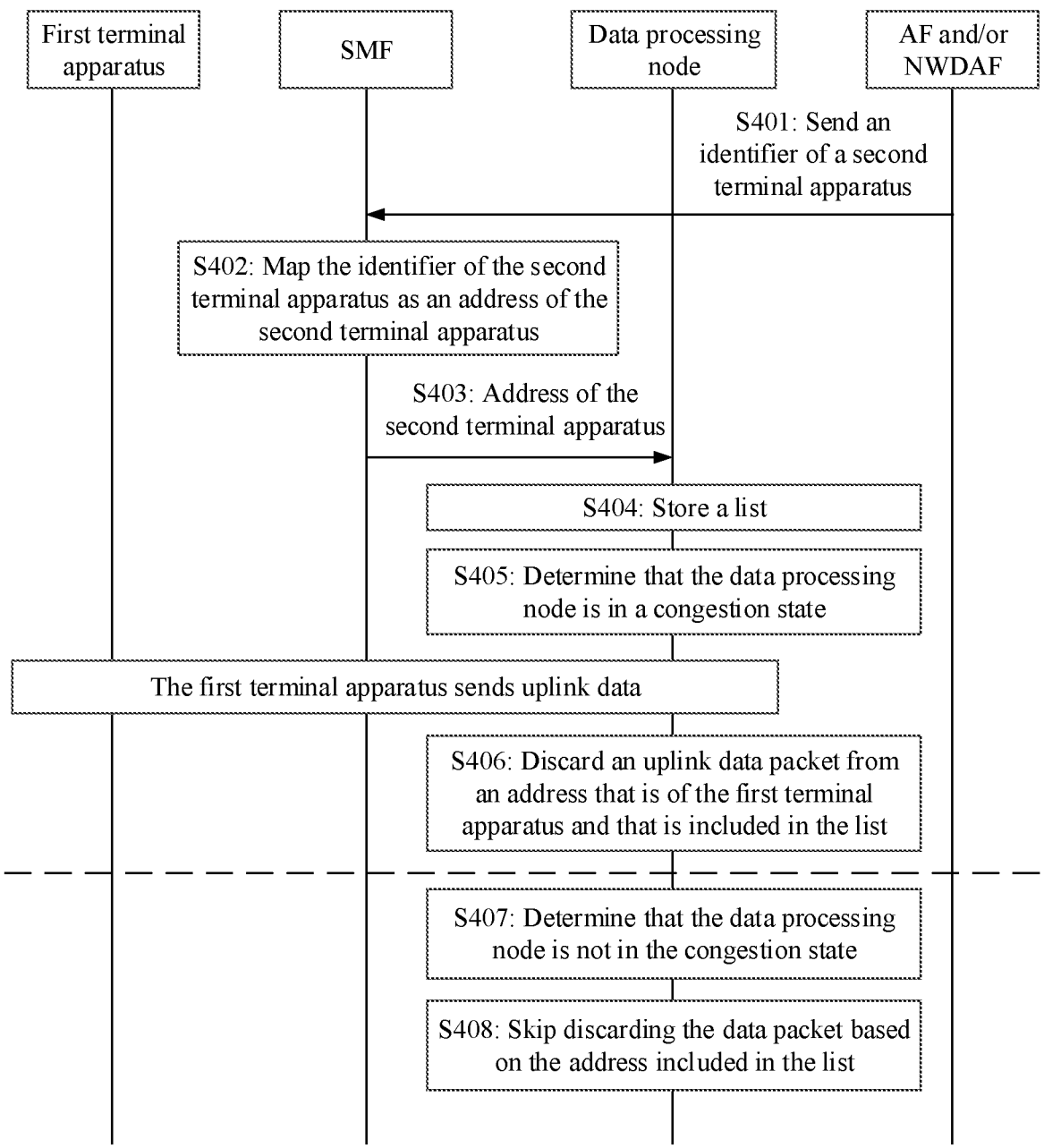
FIG. 5 is a flowchart of another congestion control method according to an embodiment of this application.

In addition, a congestion control method according to an embodiment of this application may alternatively be performed by a data processing node, and the data processing node includes a UPF and/or an NEF. In this case, the method may include the following steps, as shown in FIG. 5.

S401: An AF and/or an NWDAF send/sends an identifier of a second terminal apparatus to an SMF.

The SMF may further receive, from the AF and/or the NWDAF, an address of a victim of an abnormal behavior identified by the AF and/or the NWDAF. The address of the victim is, for example, an IP address or a media access control (media access control, MAC) address of a victim of a DDoS attack of the second terminal apparatus. An address of a victim of an abnormal behavior corresponds to a second terminal apparatus having the abnormal behavior.

S402: The SMF maps the identifier of the second terminal apparatus as an address of the second terminal apparatus.

The address of the second terminal apparatus may be used by the data processing node to identify the second terminal apparatus.

For example, if the data processing node includes the UPF, the address of the second terminal apparatus may include an IP address. If the data processing node includes the NEF, the address of the second terminal apparatus may include a MAC address.

For example, the SMF may further map the address of the victim as a data packet filter by using a PCF. The data packet filter may include an IP address. For example, a source IP address is all 0s, and a destination IP address is the IP address of the victim; or a source IP address is an IP address of a first terminal apparatus, and a destination IP address is the IP address of the victim. The data packet filter may alternatively include a MAC address. For example, a source MAC address is all 0s, and a destination MAC address is the MAC address of the victim; or a source MAC address is a MAC address of UE, and a destination MAC address is the MAC address of the victim.

S403: The SMF sends the address of the second terminal apparatus to the data processing node.

Correspondingly, the data processing node receives the address of the second terminal apparatus.

For example, the SMF may send the data packet filter to the data processing node.

S404: The data processing node stores a list, where the list includes the address of the second terminal apparatus.

Therefore, the data processing node may store a list of addresses of terminal apparatuses in abnormal states.

For example, the list may include a correspondence between an address of a second terminal apparatus and a data packet filter.

For example, the data processing node may set third duration corresponding to the address of the second terminal apparatus, or set fourth duration corresponding to the list. For a setting manner and a use rule of the third duration, refer to those of the foregoing first duration.

For a setting manner and a use rule of the fourth duration, refer to those of the foregoing second duration.

S405: The data processing node determines that the data processing node is in a congested state.

S406: The data processing node discards an uplink data packet from an address that is of the first terminal apparatus and that is included in the list.

For example, the data processing node determines whether a source IP address of a data packet that needs to be forwarded is included in the list, and if the source IP address of the data packet is included in the list, the data processing node may discard the data packet.

For example, if the list includes a correspondence between an address and a data packet filter, the data processing node may discard a data packet based on the correspondence. For example, when in a data packet filter, a source IP address is all 0s, and a destination IP address is an IP address of a victim, the data processing node obtains, based on the address in the list, all data packets sent from the address, and discards, based on the packet filter, a data packet whose destination IP address is the IP address of the victim.

Optionally, the method may further include the following steps.

S407: The data processing node determines that the data processing node is not in the congested state.

S408: The data processing node does not discard a data packet based on the address included in the list.

Figure 6:
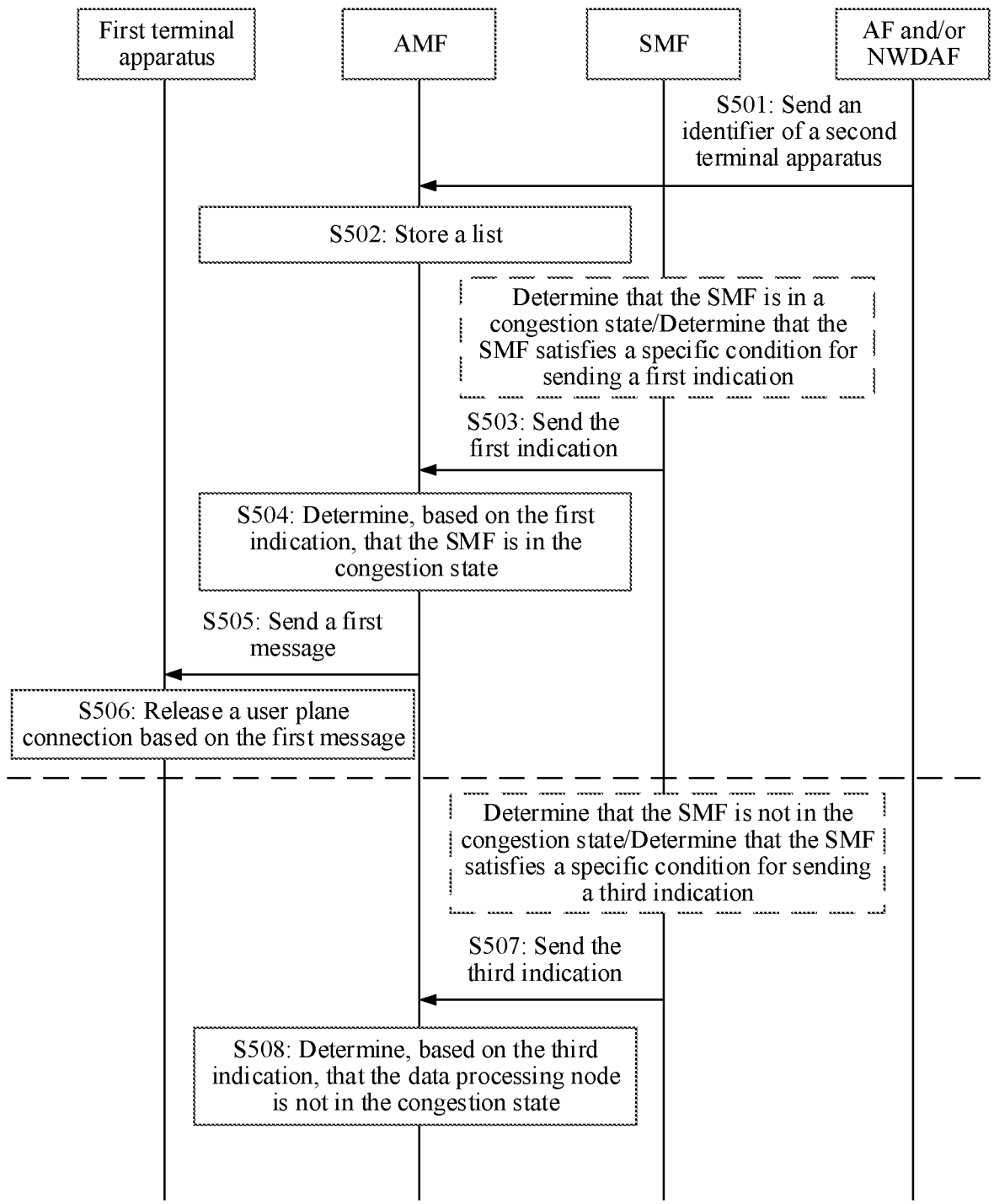
FIG. 6 is a flowchart of another congestion control method according to an embodiment of this application.

With reference to FIG. 6, the following describes a congestion control method according to an embodiment of this application when a control node includes an AMF. In the congestion control method, the AMF may perform congestion control in response to a congested state of a data processing node SMF, to reduce occupation of the data processing node by data.

S501: An AF and/or an NWDAF send/sends an identifier of a second terminal apparatus to the AMF.

Correspondingly, the AMF receives the identifier of the second terminal apparatus from the AF and/or the NWDAF.

Optionally, the AMF may further receive, from the AF and/or the NWDAF, an identifier of an abnormal state of the second terminal apparatus.

For a manner in which the NWDAF and/or the AF determine/determines the identifier of the second terminal apparatus, refer to the foregoing descriptions.

S502: The AMF stores a list, where the list includes the identifier of the second terminal apparatus.

The list may include the identifier of the second terminal apparatus.

S503: The data processing node SMF sends a first indication to the AMF.

The first indication is used to indicate that the SMF is in the congested state, and the first indication may be sent after the SMF determines that the SMF enters the congested state.

Alternatively, the data processing node SMF may send the first indication to the AMF when a condition for sending the first indication is satisfied, where the first indication may be used to indicate a running status of the SMF. The first indication may include an identifier of the SMF.

Correspondingly, the AMF receives the first indication from the SMF.

Before S503 is performed, the AMF may send a second indication to the data processing node SMF, where the second indication is used to indicate the data processing node SMF to send the first indication to the AMF after the data processing node SMF is in the congested state. For example, the second indication may include a first usage threshold and/or a first packet loss rate threshold.

Alternatively, the second indication may be used to indicate the SMF to send, to the AMF when the condition for sending the first indication is satisfied, the first indication used to indicate the running status of the SMF.

S504: The AMF determines, based on the first indication, that the SMF is in the congested state.

S505: The AMF sends a first message to a first terminal apparatus, where the first message is used to indicate the first terminal apparatus to release a user plane connection.

Correspondingly, the first terminal apparatus receives the first message.

For example, the first message may carry an identifier of the user plane connection.

The first message may carry a fifth indication, and the fifth indication may be used to indicate the first terminal apparatus not to send a response message corresponding to the first message.

After determining that the data processing node is in the congested state, if the AMF receives a signaling request from the first terminal apparatus, the AMF sends a reject response corresponding to the signaling establishment request to the first terminal apparatus. Further, the reject response corresponding to the signaling establishment request may be further used to indicate the first terminal apparatus not to send the signaling establishment request within fourth duration.

After determining that the data processing node is in the congested state, the AMF may send a second message to the first terminal apparatus, where the second message may be used to indicate to set a location of the first terminal apparatus to an unsupported area, and the unsupported area does not support the first terminal apparatus in requesting to establish a signaling connection.

The second message may carry indication information, and the indication information may be used to indicate the first terminal apparatus not to send a response message corresponding to the first message.

S506: The first terminal apparatus releases the user plane connection based on the first message.

When the first message includes the identifier of the user plane connection, the first terminal apparatus may release the user plane connection to which the identifier belongs. Alternatively, when the first message does not include the identifier of the user plane connection, the first terminal apparatus may release all user plane connections of the first terminal apparatus.

If the first message includes the fifth indication, the first terminal apparatus may further skip, in response to the fifth indication, sending the response message corresponding to the first message to the SMF.

In addition, if the first terminal apparatus receives the second message from the AMF, the first terminal apparatus may set the location of the first terminal apparatus to the unsupported area based on the second message, so that the signaling connection establishment request is not sent.

Optionally, after S506, the following steps may be further performed:

S507: The data processing node SMF sends a third indication to the AMF. The third indication may include the identifier of the data processing node.

The third indication may be used to indicate that the SMF is not in the congested state. In this case, the third indication may be sent by the SMF after the SMF determines that the SMF is not in the congested state.

Alternatively, the third indication may be used to indicate a running status of the SMF. In this case, the third indication may be sent by the SMF after the SMF satisfies a condition for sending the third indication.

Correspondingly, the AMF receives the third indication from the data processing node.

Before S507 is performed, the AMF may further send a fourth indication to the SMF.

The fourth indication may be used to indicate the SMF to send, to the AMF when the SMF is not in the congested state, the third indication used to indicate that the data processing node is not in the congested state.

Alternatively, the fourth indication may be used to indicate the SMF to send, when the condition for sending the third indication is satisfied, the third indication used to indicate the running status of the SMF.

S508: The AMF determines, based on the third indication, that the data processing node is not in the congested state.

For example, after determining that the data processing node is not in the congested state, the AMF does not prohibit establishing a signaling connection of the first terminal apparatus. If the AMF receives a signaling establishment request from the first terminal apparatus, the AMF may send, to the first terminal apparatus, an accept response corresponding to the signaling establishment request.

Based on a same inventive concept as the foregoing method embodiments, an embodiment of this application further provides a communication apparatus. The communication apparatus may have a function of any one of the control node, the first terminal apparatus, or the data processing node in the foregoing method embodiments, and may be configured to perform the steps that are performed by any one of the control node, the first terminal apparatus, or the data processing node and that are provided in the foregoing method embodiments. The function may be implemented by hardware, or may be implemented by software or hardware executing corresponding software. The hardware or the software includes one or more modules corresponding to the foregoing function.

Figure 7:
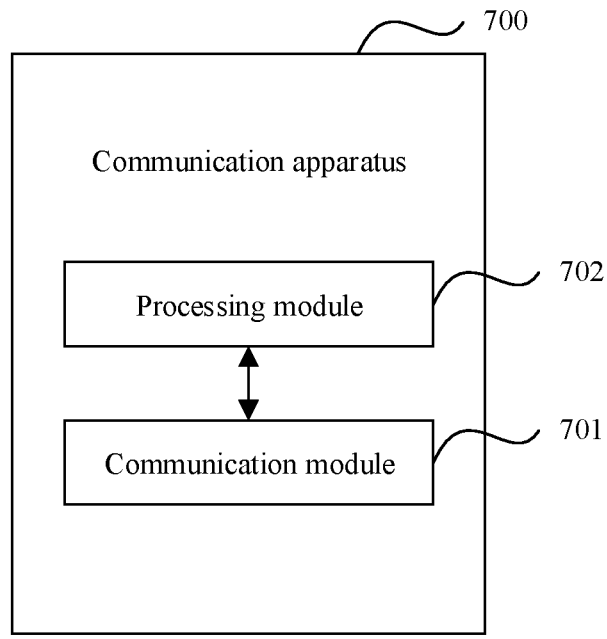
FIG. 7 is a diagram of a structure of a communication apparatus according to an embodiment of this application.

In an implementation, a communication apparatus 700 shown in FIG. 7 may be used as the control node in the foregoing method embodiment, and performs the steps performed by the control node in the foregoing method embodiment. The control node may include an SMF and/or an AMF. As shown in FIG. 7, the communication apparatus 700 may include a communication module 701 and a processing module 702. The communication module 701 and the processing module 702 are coupled to each other. The communication module 701 may be configured to support the communication apparatus 700 in performing communication. The communication module 701 may have a wired communication function, for example, can communicate with another network element in a wired manner. The processing module 702 may be configured to support the communication apparatus 700 in performing the processing action in the foregoing method embodiment, including but not limited to: generating information and a message that are sent by the communication module 701, and/or demodulating and decoding a signal received by the communication module 701.

When the communication apparatus 700 performs the steps performed by the control node in the foregoing method embodiment, the processing module 702 may be configured to determine that a data processing node is in a congested state, where the data processing node is configured to process data sent by a terminal apparatus; and the communication module 701 may be configured to send a first message to a first terminal apparatus corresponding to a terminal apparatus identifier in a list stored in the control node, where the terminal apparatus identifier in the list is an identifier that is of the first terminal apparatus in an abnormal state and that is received by the control node, the first message is used to indicate to release a user plane connection, and the user plane connection is used to transmit data of the first terminal apparatus.

During implementation, the communication module 701 may further receive an identifier of a second terminal apparatus, where the second terminal apparatus is a terminal apparatus in the abnormal state.

Each second terminal apparatus satisfies any one or more of the following conditions: a distributed denial of service DDoS attack exists in a user plane data transmission process of the second terminal apparatus; a target address of user plane data of the second terminal apparatus is incorrect; transmission duration of user plane data of the second terminal apparatus reaches threshold duration; a data length of user plane data of the second terminal apparatus reaches a threshold length; or a transmission rate of user plane data of the second terminal apparatus reaches a threshold rate.

If the data processing node is not in the congested state within first duration, the processing module 702 may further delete the identifier of the second terminal apparatus from the list.

In addition, if the data processing node is not in the congested state within second duration, the processing module 702 may further delete the list, or delete all identifiers from the list.

The communication module 701 may be further configured to receive a first indication, where the first indication is used to indicate that the data processing node is in the congested state. The processing module 702 may determine, based on the first indication, that the data processing node is in the congested state.

Before receiving the first indication, the communication module 701 may further send a second indication to the data processing node, where the second indication is used to indicate the data processing node to send the first indication when the data processing node is in the congested state.

Optionally, the first message may include an identifier of the user plane connection.

In an implementation, when the control node includes an SMF, and there are a plurality of data processing nodes, the processing module 702 may further determine an identifier of a data network based on respective contexts of the plurality of data processing nodes, where at least two of the plurality of data processing nodes support the data network, the respective contexts of the plurality of data processing nodes are stored in the control node, and the context of each data processing node includes an identifier of a data network supported by the data processing node; and the processing module 702 may determine the identifier of the user plane connection based on a context of the first terminal apparatus and the identifier of the data network, where the context of the first terminal apparatus is stored in the control node, and the context of the first terminal apparatus includes the identifier of the user plane connection that accesses the data network.

In another implementation, when the control node includes an AMF, and there are a plurality of data processing nodes, the communication module 701 may be further configured to receive an identifier of a data network from an SMF, where at least two of the plurality of data processing nodes support the data network; and the processing module 702 may be further configured to determine the identifier of the user plane connection based on a context of the first terminal apparatus and the identifier of the data network, where the context of the first terminal apparatus is stored in the control node, and the context of the first terminal apparatus includes the identifier of the user plane connection that accesses the data network.

After it is determined that the data processing node is in the congested state, when the control node is the SMF, after receiving a first user plane connection establishment request from the first terminal apparatus, the communication module 701 may further send a reject response to the first terminal apparatus, where the reject response corresponds to the first user plane connection establishment request, and the reject response is used to indicate the first terminal apparatus not to send the user plane connection establishment request within third duration.

The processing module 702 may be further configured to determine that the data processing node is not in the congested state. In this case, after receiving a second user plane connection establishment request from the first terminal apparatus, the communication module 701 may further send an accept response to the first terminal apparatus, where the accept response corresponds to the second user plane connection establishment request.

After it is determined that the data processing node is in the congested state, when the control node is the AMF, after receiving a first signaling connection establishment request from the first terminal apparatus, the communication module 701 may further send a reject response to the first terminal apparatus, where the reject response corresponds to the first signaling connection establishment request, and the reject response is used to indicate the abnormal terminal apparatus not to send the signaling connection establishment request within fourth duration.

The processing module 702 may be further configured to determine that the data processing node is not in the congested state. In this case, after receiving a second signaling connection establishment request from the first terminal apparatus, the communication module 701 may further send an accept response to the first terminal apparatus, where the accept response corresponds to the second signaling connection establishment request.

The communication module 701 may be further configured to receive a third indication, where the third indication is used to indicate that the data processing node is not in the congested state. The processing module 702 may determine, based on the third indication, that the data processing node is not in the congested state.

Before receiving the third indication, the communication module 701 may further send a fourth indication to the data processing node, where the fourth indication is used to indicate the data processing node to send the third indication when the data processing node is not in the congested state.

When the control node includes the AMF, the communication module 701 may be further configured to send a second message to the first terminal apparatus, where the second message may be used to indicate to set a location of the first terminal apparatus to an unsupported area, and the unsupported area does not support the first terminal apparatus in requesting to establish a signaling connection.

The first message may include a fifth indication, and the fifth indication is used to indicate the first terminal apparatus not to reply to the first message.

In another implementation, the communication apparatus provided in this embodiment of this application may alternatively include a hardware component, such as a processor, a memory, or a communication interface.

Figure 8:
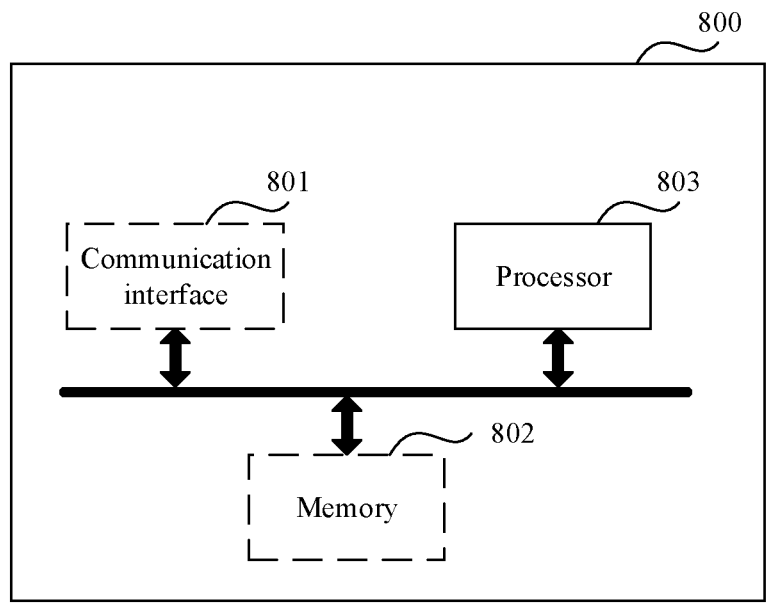
FIG. 8 is a diagram of a structure of another communication apparatus according to an embodiment of this application.

For example, if the communication apparatus is a control node, for example, an SMF or an AMF, a structure of the communication apparatus may be shown in FIG. 8. For ease of understanding, FIG. 8 shows only a structure necessary for performing the method shown in this application, and no limitation is imposed on that the communication apparatus may have more components in this application. A communication apparatus 800 may include a communication interface 801, a memory 802, and a processor 803. The communication interface 801 may be used by the communication apparatus 800 to perform communication, for example, configured to send or receive a signal. The communication interface 801 may be used by the communication apparatus 800 to send and receive a signal in a wired manner. For example, if the communication apparatus 800 is the SMF, the communication interface 801 may be used by the communication apparatus 800 to communicate with a core network element or an access network element such as an AMF, an AF, an NWDAF, a UPF, or an NEF. For another example, if the communication apparatus 800 is the AMF, the communication interface 801 may be used by the communication apparatus 800 to communicate with a core network element or an access network element such as an SMF, an AF, an NWDAF, a UPF, or an NEF. The memory 802 may be coupled to the processor 803, and is configured to store a program and data that are necessary for the communication apparatus 800 to implement functions. The processor 803 is configured to support the communication apparatus 800 in performing a corresponding processing function in the foregoing method, for example, generating information and a message that are sent by the communication interface 801, and/or demodulating and decoding a signal received by the communication interface 801. The memory 802 and the processor 803 may be integrated together or may be independent of each other.

It should be understood that the memory 802 and/or the communication interface 801 may alternatively be externally connected to the communication apparatus 800. If both the memory 802 and the communication interface 801 are externally connected to the communication apparatus 800, the communication apparatus 800 may include the processor 803.

In addition, it should be understood that the communication module 701 may have a structure shown in the communication interface 801. The processing module 702 may include the processor 803, or include the processor 803 and the memory 802.

The communication apparatus 800 may alternatively include a chip. For example, the chip includes the processor 803. In addition, the chip may further include the memory 802 and the communication interface 801, and two of the memory 802, the communication interface 801, and the processor 803 may be coupled to each other.

When the foregoing communication apparatus is implemented by using the structure shown in FIG. 8, the processor 803 may perform the foregoing steps performed by the processing module 702, and the communication interface 801 performs the foregoing steps performed by the communication module 701. The memory 802 may be configured to store a program, and the processor 803 invokes the program to perform the steps performed by the processing module 702.

When the communication apparatus 800 performs the steps performed by the control node in the foregoing method embodiment, the processor 803 may be configured to determine that a data processing node is in a congested state, where the data processing node is configured to process data sent by a terminal apparatus; and the communication interface 801 may be configured to send a first message to a first terminal apparatus corresponding to a terminal apparatus identifier in a list stored in the control node, where the terminal apparatus identifier in the list is an identifier that is of the first terminal apparatus in an abnormal state and that is received by the control node, the first message is used to indicate to release a user plane connection, and the user plane connection is used to transmit data of the first terminal apparatus.

During implementation, the communication interface 801 may further receive an identifier of a second terminal apparatus, where the second terminal apparatus is a terminal apparatus in the abnormal state.

Each second terminal apparatus satisfies any one or more of the following conditions: a distributed denial of service DDoS attack exists in a user plane data transmission process of the second terminal apparatus; a target address of user plane data of the second terminal apparatus is incorrect; transmission duration of user plane data of the second terminal apparatus reaches threshold duration; a data length of user plane data of the second terminal apparatus reaches a threshold length; or a transmission rate of user plane data of the second terminal apparatus reaches a threshold rate.

If the data processing node is not in the congested state within first duration, the processor 803 may further delete the identifier of the second terminal apparatus from the list.

In addition, if the data processing node is not in the congested state within second duration, the processor 803 may further delete the list, or delete all identifiers from the list.

The communication interface 801 may be further configured to receive a first indication, where the first indication is used to indicate that the data processing node is in the congested state. The processor 803 may determine, based on the first indication, that the data processing node is in the congested state.

Before receiving the first indication, the communication interface 801 may further send a second indication to the data processing node, where the second indication is used to indicate the data processing node to send the first indication when the data processing node is in the congested state.

Optionally, the first message may include an identifier of the user plane connection.

In an implementation, when the control node includes an SMF, and there are a plurality of data processing nodes, the processor 803 may further determine an identifier of a data network based on respective contexts of the plurality of data processing nodes, where at least two of the plurality of data processing nodes support the data network, the respective contexts of the plurality of data processing nodes are stored in the control node, and the context of each data processing node includes an identifier of a data network supported by the data processing node; and the processor 803 may determine the identifier of the user plane connection based on a context of the first terminal apparatus and the identifier of the data network, where the context of the first terminal apparatus is stored in the control node, and the context of the first terminal apparatus includes the identifier of the user plane connection that accesses the data network.

In another implementation, when the control node includes an AMF, and there are a plurality of data processing nodes, the communication interface 801 may be further configured to receive an identifier of a data network from an SMF, where at least two of the plurality of data processing nodes support the data network; and the processor 803 may be further configured to determine the identifier of the user plane connection based on a context of the first terminal apparatus and the identifier of the data network, where the context of the first terminal apparatus is stored in the control node, and the context of the first terminal apparatus includes the identifier of the user plane connection that accesses the data network.

After it is determined that the data processing node is in the congested state, when the control node is the SMF, after receiving a first user plane connection establishment request from the first terminal apparatus, the communication interface 801 may further send a reject response to the first terminal apparatus, where the reject response corresponds to the first user plane connection establishment request, and the reject response is used to indicate the first terminal apparatus not to send the user plane connection establishment request within third duration.

The processor 803 may be further configured to determine that the data processing node is not in the congested state. In this case, after receiving a second user plane connection establishment request from the first terminal apparatus, the communication interface 801 may further send an accept response to the first terminal apparatus, where the accept response corresponds to the second user plane connection establishment request.

After it is determined that the data processing node is in the congested state, when the control node is the AMF, after receiving a first signaling connection establishment request from the first terminal apparatus, the communication interface 801 may further send a reject response to the first terminal apparatus, where the reject response corresponds to the first signaling connection establishment request, and the reject response is used to indicate the abnormal terminal apparatus not to send the signaling connection establishment request within fourth duration.

The processor 803 may be further configured to determine that the data processing node is not in the congested state. In this case, after receiving a second signaling connection establishment request from the first terminal apparatus, the communication interface 801 may further send an accept response to the first terminal apparatus, where the accept response corresponds to the second signaling connection establishment request.

The communication interface 801 may be further configured to receive a third indication, where the third indication is used to indicate that the data processing node is not in the congested state. The processor 803 may determine, based on the third indication, that the data processing node is not in the congested state.

Before receiving the third indication, the communication interface 801 may further send a fourth indication to the data processing node, where the fourth indication is used to indicate the data processing node to send the third indication when the data processing node is not in the congested state.

When the control node includes the AMF, the communication interface 801 may be further configured to send a second message to the first terminal apparatus, where the second message may be used to indicate to set a location of the first terminal apparatus to an unsupported area, and the unsupported area does not support the first terminal apparatus in requesting to establish a signaling connection.

The first message may include a fifth indication, and the fifth indication is used to indicate the first terminal apparatus not to reply to the first message.

Figure 9:
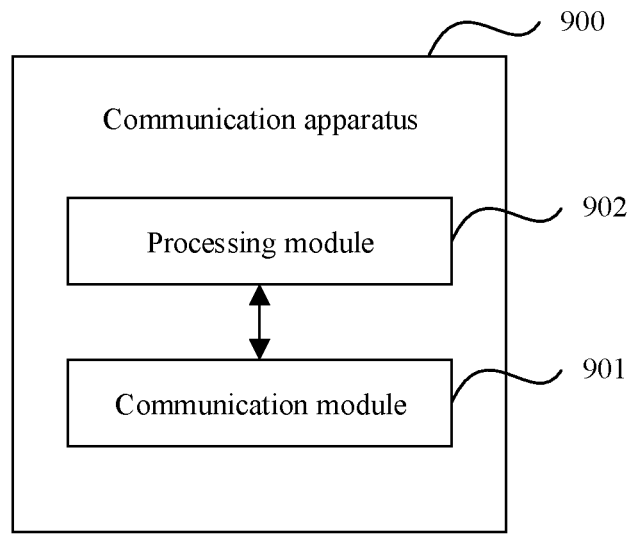
FIG. 9 is a diagram of a structure of another communication apparatus according to an embodiment of this application.

In an implementation, a communication apparatus 900 shown in FIG. 9 may be used as the first terminal apparatus in the foregoing method embodiment, and performs the steps performed by the first terminal apparatus in the foregoing method embodiment. For example, the first terminal apparatus may include the UE or the terminal apparatus in this application. As shown in FIG. 9, the communication apparatus 900 may include a communication module 901 and a processing module 902. The communication module 901 and the processing module 902 are coupled to each other. The communication module 901 may be configured to support the communication apparatus 900 in performing communication, and the communication module 901 may have a wireless communication function. The processing module 902 may be configured to support the communication apparatus 900 in performing the processing action in the foregoing method embodiment, including but not limited to: generating information and a message that are sent by the communication module 901, and/or demodulating and decoding a signal received by the communication module 901.

When the communication apparatus 900 performs the steps performed by the first terminal apparatus in the foregoing method embodiment, the communication module 901 may be configured to receive a first message from a control node, where the first message is used to indicate to release a user plane connection, the user plane connection is used to transmit data of the terminal apparatus, the first control message includes a fifth indication, and the fifth indication is used to indicate the first terminal apparatus not to reply to the first message; and the processing module 902 may be configured to release the user plane connection.

In another implementation, the communication apparatus provided in this embodiment of this application may alternatively include a hardware component, such as a processor, a memory, or a transceiver.

Figure 10:
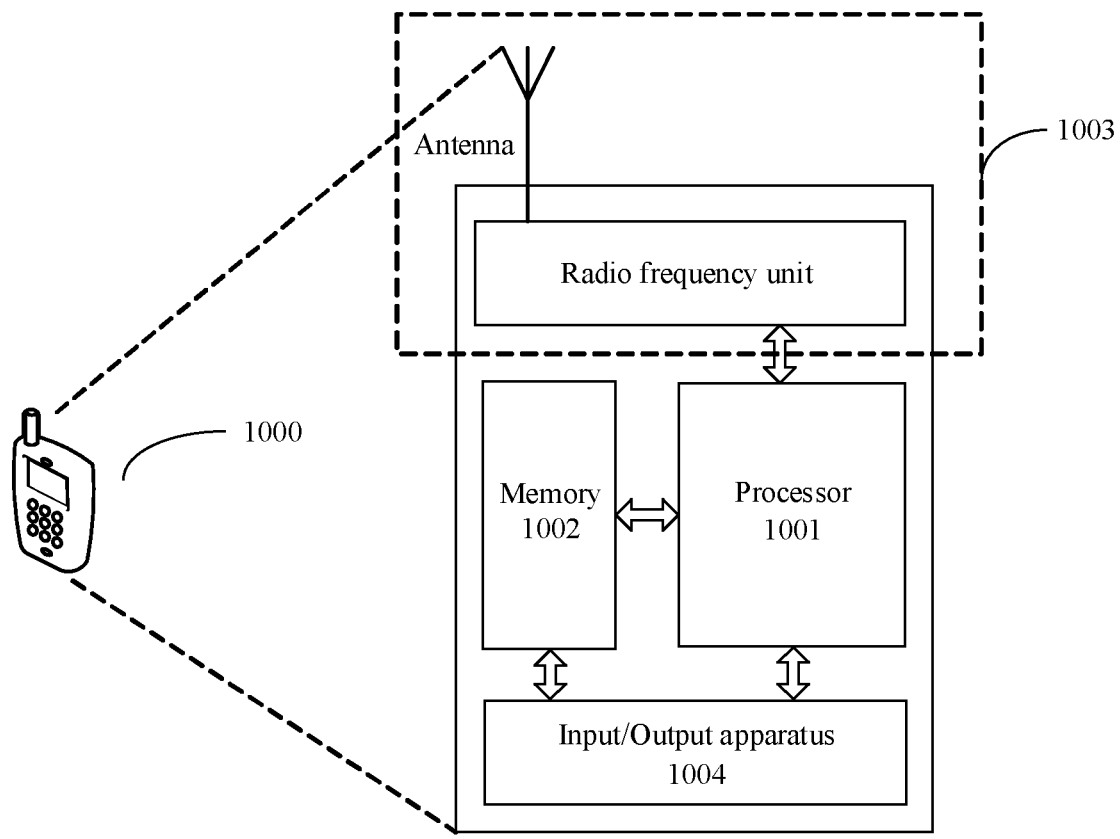
FIG. 10 is a diagram of a structure of another communication apparatus according to an embodiment of this application.

When the communication apparatus is the foregoing first terminal apparatus, a structure of the communication apparatus may be alternatively shown in FIG. 10. For ease of understanding and illustration, in FIG. 10, a mobile phone is used as an example to describe a structure of a communication apparatus 1000. As shown in FIG. 10, the communication apparatus 1000 may include a processor 1001, a memory 1002, and a transceiver 1003.

The processor 1001 may be configured to: process a communication protocol and communication data, control the first terminal apparatus, execute a software program, process data of the software program, and the like. The memory 1002 may be configured to store the program and data, and the processor 1001 may perform, based on the program, the method performed by the first terminal apparatus in the embodiments of this application.

The transceiver 1003 may include a radio frequency unit and an antenna. The radio frequency unit may be configured to: perform conversion between a baseband signal and a radio frequency signal, and process the radio frequency signal. The antenna may be configured to send and receive a radio frequency signal in a form of an electromagnetic wave. In addition, only the radio frequency unit may be considered as the transceiver 1003. In this case, the communication apparatus 1000 may include the processor 1001, the memory 1002, the transceiver 1003, and the antenna.

In addition, the communication apparatus 1000 may further include an input/output apparatus 1004, for example, a component such as a touchscreen, a display screen, or a keyboard that may be configured to receive data entered by a user and output data to the user. It should be noted that some types of communication apparatuses may not have the input/output apparatus.

It should be understood that the communication module 901 may have a structure shown in the transceiver 1003, that is, the communication module 901 includes the radio frequency unit and the antenna. Alternatively, the communication module 901 may include the foregoing radio frequency unit. The processing module 902 may include the processor 1001, or include the processor 1001 and the memory 1002.

The communication apparatus 1000 may alternatively include a chip. For example, the chip includes the processor 1001. In addition, the chip may further include the memory 1002 and the transceiver 1003, and two of the memory 1002, the transceiver 1003, and the processor 1001 may be coupled to each other.

When the communication apparatus 1000 performs the method shown in the embodiments of this application, the transceiver 1003 may be configured to perform the steps performed by the communication module 901. In addition, the processor 1001 invokes the program stored in the memory 1002, to perform the steps performed by the processing module 902.

When the communication apparatus 1000 performs the steps performed by the first terminal apparatus in the foregoing method embodiment, the transceiver 1003 may be configured to receive a first message from a control node, where the first message is used to indicate to release a user plane connection, the user plane connection is used to transmit data of the terminal apparatus, the first control message includes a fifth indication, and the fifth indication is used to indicate the first terminal apparatus not to reply to the first message; and the processor 1001 may be configured to release the user plane connection.

Figure 11:
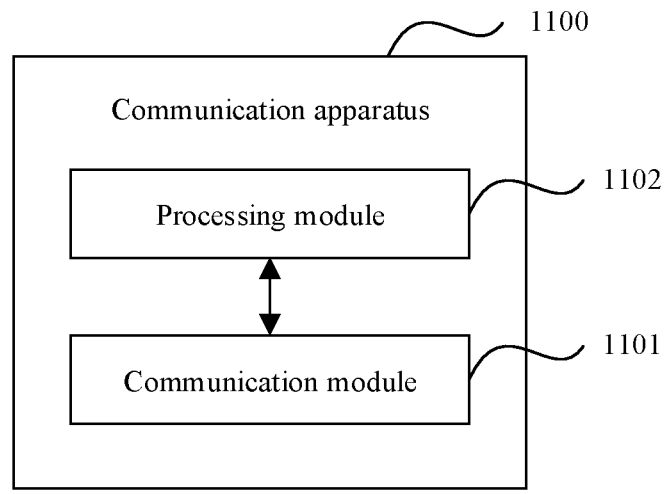
FIG. 11 is a diagram of a structure of another communication apparatus according to an embodiment of this application.

In an implementation, a communication apparatus 1100 shown in FIG. 11 may be used as the data processing node in the foregoing method embodiment, and performs the steps performed by the data processing node in the foregoing method embodiment. The data processing node may include a UPF and/or an NEF. As shown in FIG. 11, the communication apparatus 1100 may include a communication module 1101 and a processing module 1102. The communication module 1101 and the processing module 1102 are coupled to each other. The communication module 1101 may be configured to support the communication apparatus 1100 in performing communication. The communication module 1101 may have a wired communication function, for example, can communicate with another network element in a wired manner. The processing module 1102 may be configured to support the communication apparatus 1100 in performing the processing action in the foregoing method embodiment, including but not limited to: generating information and a message that are sent by the communication module 1101, and/or demodulating and decoding a signal received by the communication module 1101.

When the communication apparatus 1100 performs the steps performed by the data processing node in the foregoing method embodiment, the processing module 1102 may be configured to determine that the data processing node is not in a congested state; and the communication module 1101 may be configured to send a third indication to a control node, where the third indication is used to indicate that the data processing node is in the congested state.

The third indication may include an identifier of the data processing node.

Before sending the third indication, the communication module 1101 may be further configured to receive a fourth indication from the control node, where the fourth indication is used to indicate the data processing node to send the third indication when the data processing node is not in the congested state.

In another implementation, the communication apparatus provided in this embodiment of this application may alternatively include a hardware component, such as a processor, a memory, or a communication interface.

Figure 12:
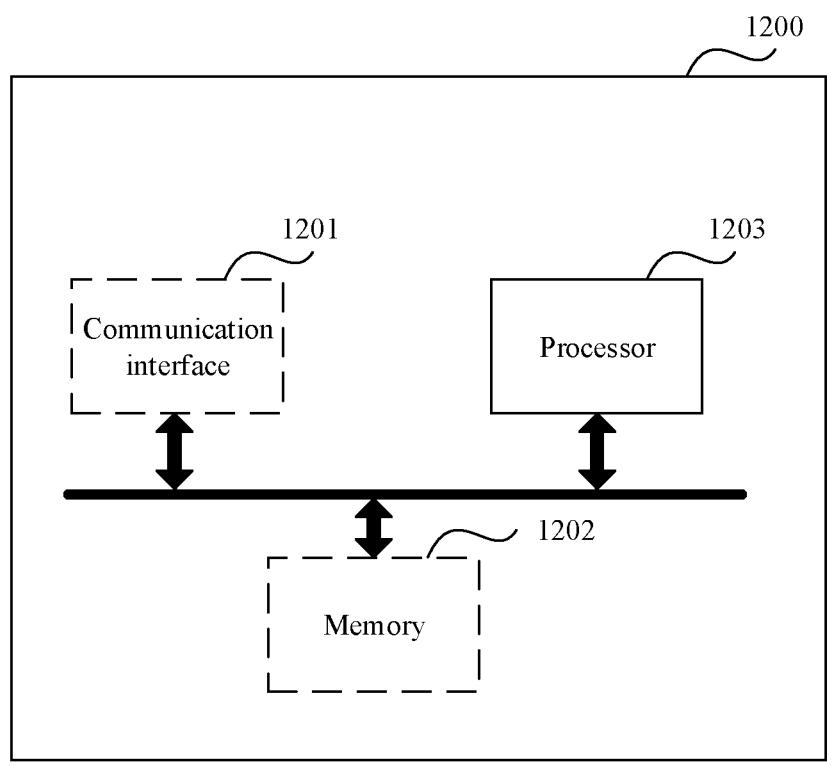
FIG. 12 is a diagram of a structure of another communication apparatus according to an embodiment of this application.

For example, if the communication apparatus is a control node, for example, an NEF or an UPF, a structure of the communication apparatus may be shown in FIG. 12. For ease of understanding, FIG. 12 shows only a structure necessary for performing the method shown in this application, and no limitation is imposed on that the communication apparatus may have more components in this application. A communication apparatus 1200 may include a communication interface 1201, a memory 1202, and a processor 1203. The communication interface 1201 may be used by the communication apparatus 1200 to perform communication, for example, configured to send or receive a signal. The communication interface 1201 may be used by the communication apparatus 1200 to send and receive a signal in a wired manner. For example, if the communication apparatus 1200 is the UPF, the communication interface 1201 may be used by the communication apparatus 1200 to communicate with an SMF, a RAN, a DN, or another core network element or access network element. For another example, if the communication apparatus 1200 is the NEF, the communication interface 1201 may be used by the communication apparatus 1200 to communicate with an SMF, an AMF, or another core network element or access network element. The memory 1202 may be coupled to the processor 1203, and may be configured to store a program and data that are necessary for the communication apparatus 1200 to implement functions. The processor 1203 is configured to support the communication apparatus 1200 in performing a corresponding processing function in the foregoing method, for example, generating information and a message that are sent by the communication interface 1201, and/or demodulating and decoding a signal received by the communication interface 1201. The memory 1202 and the processor 1203 may be integrated together or may be independent of each other.

It should be understood that the memory 1202 and/or the communication interface 1201 may alternatively be externally connected to the communication apparatus 1200. If both the memory 1202 and the communication interface 1201 are externally connected to the communication apparatus 1200, the communication apparatus 1200 may include the processor 1203.

In addition, it should be understood that the communication module 1101 may have a structure shown in the communication interface 1201. The processing module 1102 may include the processor 1203, or include the processor 1203 and the memory 1202.

The communication apparatus 1200 may alternatively include a chip. For example, the chip includes the processor 1203. In addition, the chip may further include the memory 1202 and the communication interface 1201, and two of the memory 1202, the communication interface 1201, and the processor 1203 may be coupled to each other.

When the foregoing communication apparatus is implemented by using the structure shown in FIG. 12, the processor 1203 may perform the steps performed by the processing module 1102, and the communication interface 1201 performs the steps performed by the communication module 1101. The memory 1202 may be configured to store a program, and the processor 1203 invokes the program to perform the steps performed by the processing module 1102.

When the communication apparatus 1200 performs the steps performed by the data processing node in the foregoing method embodiment, the processor 1203 may be configured to determine that the data processing node is not in a congested state; and the communication interface 1201 may be configured to send a third indication to a control node, where the third indication is used to indicate that the data processing node is in the congested state.

The third indication may include an identifier of the data processing node.

Before sending the third indication, the communication interface 1201 may be further configured to receive a fourth indication from the control node, where the fourth indication is used to indicate the data processing node to send the third indication when the data processing node is not in the congested state.

It should be understood that the components included in the communication apparatus in the foregoing embodiments are illustrative, and are merely an example. In an actual implementation, the components included in the communication apparatus may have another composition manner. In addition, the components in the foregoing communication apparatus may be integrated into one module, or may exist independently physically. The foregoing integrated module may be implemented in a form of hardware, or may be implemented in a form of a software functional module. This should not be understood as being limited to the structure shown in the foregoing accompanying drawings.

Based on a same concept as the foregoing method embodiments, this application further provides a communication system. The communication system may include the foregoing control node and the foregoing data processing node, or include the foregoing control node, the foregoing second terminal apparatus, and the foregoing data processing node. The communication system may be configured to implement an operation performed by the control node, the second terminal apparatus, or the data processing node in any one of the foregoing method embodiment or the implementations of the foregoing method embodiment. For example, the communication system has the structure shown in FIG. 4A and FIG. 4B.

When the congestion control method provided in this embodiment of this application is implemented, the communication system may include the control node and the data processing node. In this communication system, the control node may be configured to determine that the data processing node is in a congested state, where the data processing node is configured to process data sent by a terminal apparatus. The control node may further send a first message to a first terminal apparatus corresponding to a terminal apparatus identifier in a list stored in the control node, where the terminal apparatus identifier in the list is an identifier that is of the first terminal apparatus in an abnormal state and that is received by the control node, the first message is used to indicate to release a user plane connection, and the user plane connection is used to transmit data of the first terminal apparatus.

The data control node may be configured to send a first indication to the control node. Correspondingly, the control node may receive the first indication from the data processing node. The first indication may be used to indicate that the data control node is in the congested state.

Optionally, the communication system may further include the first terminal apparatus. The first terminal apparatus may be configured to receive a first message from the control node, and release a user plane connection based on the first message.

Optionally, in this communication system, the data processing node may further send a third indication to the control node. Correspondingly, the control node may receive the third indication from the data processing node. The third indication may be used to indicate that the data processing node is not in the congested state. The third indication may be sent after the data processing node is not in the congested state.

Based on a same concept as the foregoing method embodiment, an embodiment of this application further provides a computer-readable storage medium. The computer-readable storage medium stores a computer program. When the program is executed by a processor, a computer is enabled to perform an operation performed by the control node, the second terminal apparatus, or the data processing node in any one of the foregoing method embodiment or the implementations of the foregoing method embodiment.

Based on a same concept as the foregoing method embodiment, this application further provides a computer program product. When the computer program product is invoked and executed by a computer, the computer may be enabled to perform an operation performed by the control node, the second terminal apparatus, or the data processing node in any one of the foregoing method embodiment or the implementations of the foregoing method embodiment.

Based on a same concept as the foregoing method embodiment, this application further provides a chip or a chip system. The chip may include a processor. The chip may further include a memory (or a storage module) and/or a transceiver (or a communication module); or the chip is coupled to a memory (or a storage module) and/or a transceiver (or a communications module). The transceiver (or the communication module) may be configured to support the chip in performing wired and/or wireless communication. The memory (or the storage module) may be configured to store a program. The processor invokes the program to implement an operation performed by the control node, the second terminal apparatus, or the data processing node in any one of the foregoing method embodiment or the implementations of the foregoing method embodiment. The chip system may include the foregoing chip, or may include the foregoing chip and another discrete component, such as the memory (or the storage module) and/or the transceiver (or the communication module).

The embodiments of this application are described with reference to flowcharts and/or block diagrams of the method, the apparatus, and the computer program product in the embodiments. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a special-purpose computer, an embedded processor, or a processor of another programmable data processing device to generate a machine, so that the instruction executed by a computer or a processor of another programmable data processing device generates an apparatus for implementing a function in one or more procedures in the flowcharts and/or in one or more blocks in the block diagrams.

The computer program instructions may alternatively be stored in a computer-readable memory that can instruct the computer or the another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

What is claimed is:

1. A congestion control method, comprising:
   determining, by a control node, that a data processing node is in a congested state, the data processing node being configured to process data sent by a terminal apparatus; and
   sending, by the control node based upon the determination, a first message to a first terminal apparatus corresponding to a first terminal apparatus identifier in a list stored in the control node, the first terminal apparatus identifier is of the first terminal apparatus in a first terminal apparatus abnormal state, the first terminal apparatus identifier is received by the control node, the first message indicating to release a user plane connection, and the user plane connection is used to transmit data of the first terminal apparatus, wherein the control node is an access and mobility management function (AMF) network element or a session management function (SMF) network element, and the list stored in the control node includes a list of terminal apparatus identifiers identifying terminal apparatuses in one or more terminal apparatus abnormal states.

2. The method according to claim 1, wherein the method further comprises:
   receiving, by the control node, a second terminal apparatus identifier of a second terminal apparatus, the second terminal apparatus is in a second terminal apparatus abnormal state, and the second terminal apparatus identifier is included in the list; and
   if the data processing node is not in the congested state within a first duration, deleting, by the control node, the second terminal apparatus identifier from the list.

3. The method according to claim 1, wherein if the data processing node is not in the congested state within a second duration, the method further comprises:
   deleting, by the control node, the list; or
   deleting, by the control node, all terminal apparatus identifiers from the list.

4. The method according to claim 1, wherein the determining, by the control node, that the data processing node is in the congested state comprises:
   receiving, by the control node, a first indication, the first indication indicating that the data processing node is in the congested state.

5. The method according to claim 4, wherein the method further comprises:
   sending, by the control node, a second indication to the data processing node, the second indication indicating the data processing node is to send the first indication when the data processing node is in the congested state.

6. The method according to claim 1, wherein the first message comprises a user plane connection identifier of the user plane connection.

7. The method according to claim 1, wherein the method further comprises:
   receiving, by the first terminal apparatus, the first message from the control node, wherein the first message comprises a fifth indication, the fifth indication indicating the first terminal apparatus not to reply to the first message; and
   releasing, by the first terminal apparatus, the user plane connection.

8. A communication apparatus, comprising:
a non-transitory memory storing instructions; and
a processor in communication with the memory, the processor configured, upon execution of the instructions, to perform the following steps:
determining that a data processing node is in a congested state, the data processing node being configured to process data; and
sending, based upon the determination, a first message to a first terminal apparatus corresponding to a first terminal apparatus identifier in a list stored in the communication apparatus, the first terminal apparatus identifier in the list is of the first terminal apparatus in a first terminal apparatus abnormal state, the first terminal apparatus identifier is received by the communication apparatus, the first message indicating to release a user plane connection, and the user plane connection is used to transmit data of the first terminal apparatus, wherein the communication apparatus is an access and mobility management function (AMF) network element or a session management function (SMF) network element, and the list stored in the communication apparatus includes a list of terminal apparatus identifiers identifying terminal apparatuses in one or more terminal apparatus abnormal states.

9. The communication apparatus according to claim 8, wherein the processor is further configured, upon execution of the instructions, to perform the following steps:
receiving a second terminal apparatus identifier of a second terminal apparatus, the second terminal apparatus is in a second terminal apparatus abnormal state, and the second terminal apparatus identifier is included in the list; and
if the data processing node is not in the congested state within a first duration, deleting the second terminal apparatus identifier from the list.

10. The communication apparatus according to claim 8, wherein if the data processing node is not in the congested state within a second duration, the processor is further configured, upon execution of the instructions, to perform the following steps:
deleting the list; or
deleting all terminal apparatus identifiers from the list.

11. The communication apparatus according to claim 8, wherein the processor is further configured, upon execution of the instructions, to perform the following steps:
receiving a first indication, the first indication indicating that the data processing node is in the congested state.

12. The communication apparatus according to claim 11, wherein the processor is further configured, upon execution of the instructions, to perform the following steps:
sending a second indication to the data processing node, the second indication indicating the data processing node is to send the first indication when the data processing node is in the congested state.

13. The communication apparatus according to claim 8, wherein the first message comprises a user plane connection identifier of the user plane connection.

14. The communication apparatus according to claim 8, wherein the processor is further configured, upon execution of the instructions, to perform the following steps:
receiving, by the first terminal apparatus, the first message from the communication apparatus, wherein the first message comprises a fifth indication, the fifth indication indicating the first terminal apparatus not to reply to the first message; and
releasing, by the first terminal apparatus, the user plane connection.

15. A non-transitory computer-readable storage medium storing computer instructions, that when executed by a processor, cause the processor to perform the steps of:
determining that a data processing node is in a congested state, the data processing node being configured to process data; and
sending, based upon the determination, a first message from a control node to a first terminal apparatus corresponding to a first terminal apparatus identifier in a list stored in the control node, the first terminal apparatus identifier is of the first terminal apparatus in a first terminal apparatus abnormal state, the first terminal apparatus identifier is received by the control node, the first message indicating to release a user plane connection, and the user plane connection is used to transmit data of the first terminal apparatus, wherein the communication apparatus is an access and mobility management function (AMF) network element or a session management function (SMF) network element, and the list stored in the communication apparatus includes a list of terminal apparatus identifiers identifying terminal apparatuses in one or more terminal apparatus abnormal states.

16. The computer-readable storage medium according to claim 15, wherein the computer instructions, when executed by the processor, further cause the processor to perform the steps of:
receiving a second terminal apparatus identifier of a second terminal apparatus, the second terminal apparatus is in a second terminal apparatus abnormal state, and the second terminal apparatus identifier is included in the list; and
if the data processing node is not in the congested state within a first duration, deleting the second terminal apparatus identifier from the list.

17. The computer-readable storage medium according to claim 15, wherein if the data processing node is not in the congested state within a second duration, the computer instructions, when executed by the processor, further cause the processor to perform the steps of:
deleting the list; or
deleting all terminal apparatus identifiers from the list.

18. The computer-readable storage medium according to claim 15, wherein the computer instructions, when executed by the processor, further cause the processor to perform the steps of:
receiving a first indication, the first indication indicating that the data processing node is in the congested state.

19. The computer-readable storage medium according to claim 18, wherein the computer instructions, when executed by the processor, further cause the processor to perform the steps of:
sending a second indication to the data processing node, the second indication indicating the data processing node is to send the first indication when the data processing node is in the congested state.

20. The computer-readable storage medium according to claim 15, wherein the first message comprises a user plane connection identifier of the user plane connection.

* * * * *